(12) United States Patent
Wyman et al.

(10) Patent No.: US 8,004,614 B2
(45) Date of Patent: Aug. 23, 2011

(54) METHOD AND SYSTEM FOR REDUCING THE APPEARANCE OF JAGGIES WHEN DEINTERLACING MOVING EDGES

(75) Inventors: Richard H. Wyman, Sunnyvale, CA (US); Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1496 days.

(21) Appl. No.: 11/386,191

(22) Filed: Mar. 22, 2006

(65) Prior Publication Data

US 2007/0070244 A1 Mar. 29, 2007

Related U.S. Application Data

(60) Provisional application No. 60/720,021, filed on Sep. 23, 2005.

(51) Int. Cl.
*H04N 5/14* (2006.01)
*H04N 9/64* (2006.01)
(52) U.S. Cl. ....................................... 348/701; 348/252
(58) Field of Classification Search .................. 382/266, 382/269; 348/701, 448, 458, 222.1, 252, 348/272–280, 266, 269; 375/214.16, 214.22, 214.2, 240.16, 240.22, 240.2
See application file for complete search history.

(56) References Cited

U.S. PATENT DOCUMENTS

2005/0168633 A1* 8/2005 Neuman et al. ............... 348/448
2005/0249430 A1* 11/2005 Lim ............................. 382/266

* cited by examiner

*Primary Examiner* — Nelson D. Hernández Hernández
(74) *Attorney, Agent, or Firm* — McAndrews, Held & Malloy, Ltd.

(57) ABSTRACT

A method and system for reducing the appearance of jaggies when deinterlacing moving edges in a video processing system are provided. The method may comprise detecting the direction of an angled edge in an interlaced video image to determine a filtering direction to be used for approximating absent pixels in deinterlacing the interlaced video. In detecting the direction of the angled edge, a group of windows of different sizes may be used to look at the edge, where a missing pixel is the center of each of the windows. Detecting the direction of the edge, and therefore the direction of filtering, may comprise: determining the angle associated with the edge, determining the strength of the edge, examining the pixels surrounding the absent pixel, and adjusting the first angle measure and the second angle measure based on the pattern of the surrounding pixels.

7 Claims, 18 Drawing Sheets

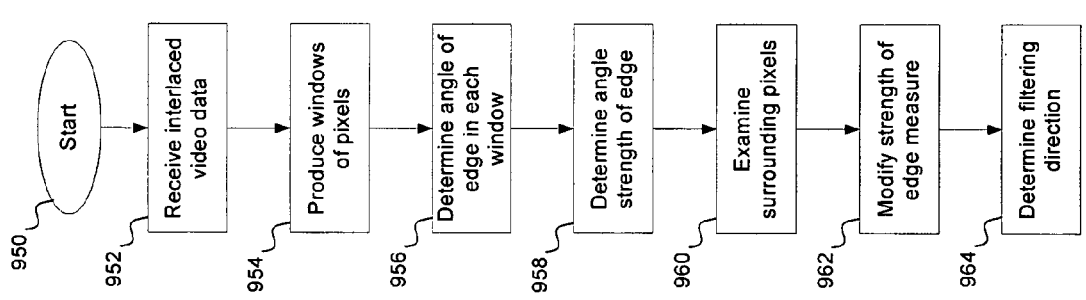

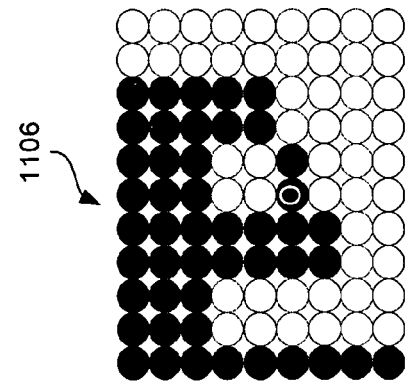
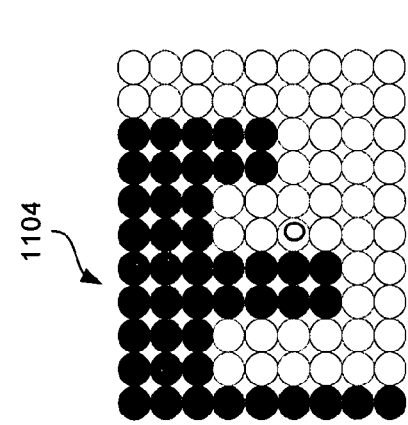
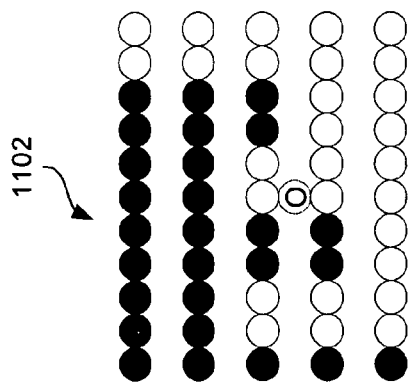
Fig. 11
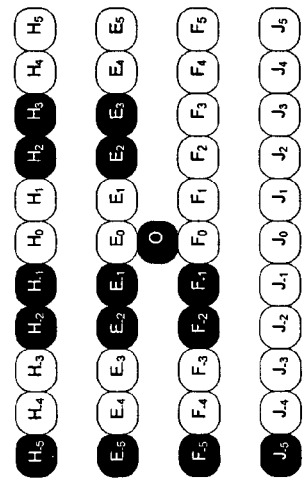
Fig. 12

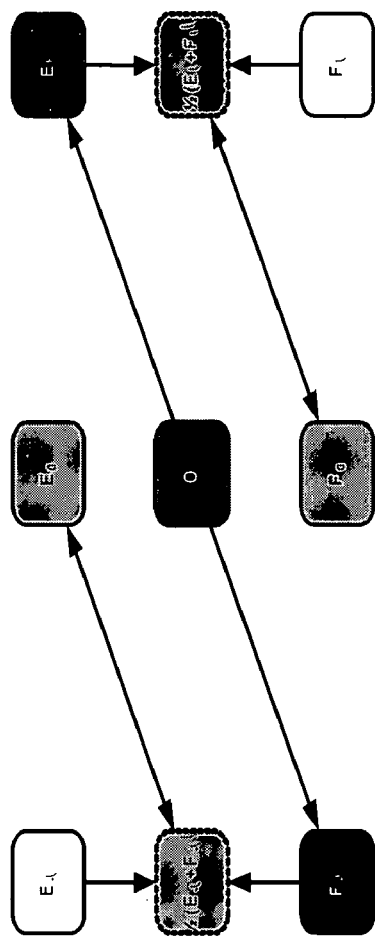
Fig. 13
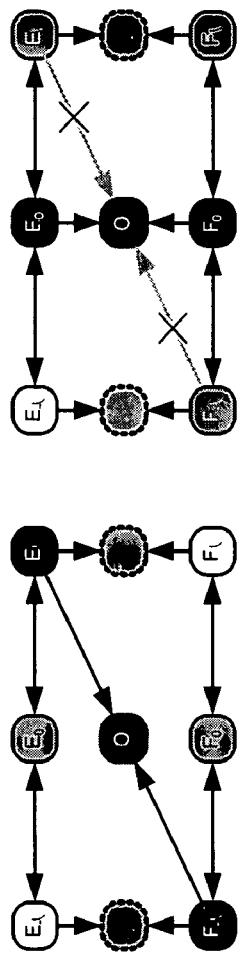
Fig. 14B
Small dead zone situation
Fig. 14A
Large dead zone situation

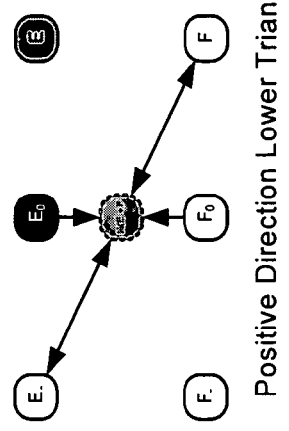
Fig. 17B — Positive Direction Lower Triangle
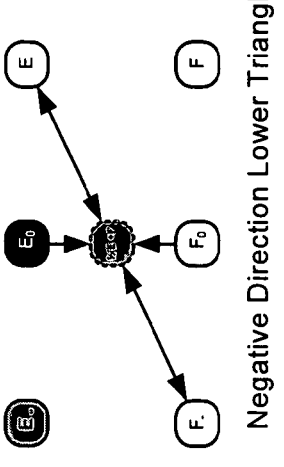
Fig. 17D — Negative Direction Lower Triangle
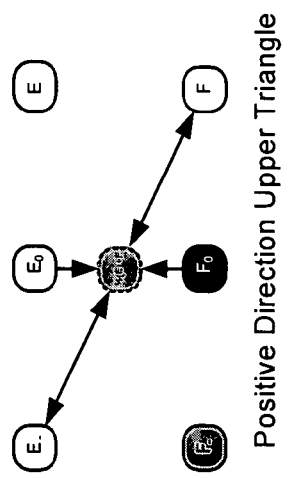
Fig. 17A — Positive Direction Upper Triangle
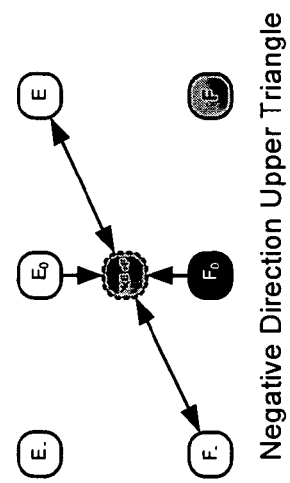
Fig. 17C — Negative Direction Upper Triangle

METHOD AND SYSTEM FOR REDUCING THE APPEARANCE OF JAGGIES WHEN DEINTERLACING MOVING EDGES

RELATED APPLICATIONS

The application makes reference to, claims priority to, and claims the benefit of U.S. Provisional Application Serial No. 60/720,021 filed on Sep. 23, 2005, which is hereby incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the present invention relate to processing video. More specifically, certain embodiments of the invention relate to a method and system for reducing the appearance of jaggies when deinterlacing moving edges.

BACKGROUND OF THE INVENTION

In video system applications, a picture is displayed on a television or a computer screen by scanning an electrical signal horizontally across the screen one line at a time using a scanning circuit. The amplitude of the signal at any one point on the line represents the brightness level at that point on the screen. When a horizontal line scan is completed, the scanning circuit is notified to retrace to the left edge of the screen and start scanning the next line provided by the electrical signal. Starting at the top of the screen, all the lines to be displayed are scanned by the scanning circuit in this manner. A frame contains all the elements of a picture. The frame contains the information of the lines that make up the image or picture and the associated synchronization signals that allow the scanning circuit to trace the lines from left to right and from top to bottom.

There may be two different types of picture or image scanning in a video system. For some television signals, the scanning may be interlaced video format, while for some computer signals the scanning may be progressive or non-interlaced video format. Interlaced video occurs when each frame is divided into two separate sub-pictures or fields. These fields may have originated at the same time or at subsequent time instances. The interlaced picture may be produced by first scanning the horizontal lines for the first field and then retracing to the top of the screen and then scanning the horizontal lines for the second field. The progressive, or non-interlaced, video format may be produced by scanning all of the horizontal lines of a frame in one pass from top to bottom.

In video compression, communication, decompression, and display, there has been for many years problems associated with supporting both interlaced content and interlaced displays along with progressive content and progressive displays. Many advanced video systems support either one format or the other format. As a result, deinterlacers, devices, or systems that convert interlaced video format into progressive video format, have become an important component in many video systems.

However, deinterlacing takes fields from interlaced video and coverts them into frames of progressive video, at double the display rate. Certain problems may arise concerning the motion of objects from image to image during deinterlacing. Objects that are in motion are encoded differently in interlaced fields and progressive frames. Video images or pictures, encoded in interlaced video format, containing little motion from one image to another may be de-interlaced into progressive video format with virtually no problems or visual artifacts. However, visual artifacts become more pronounced with video images containing a lot of motion and change from one image to another, when converted from interlaced to progressive video format. As a result, some video systems were designed with motion adaptive deinterlacers.

Areas in a video image that are static are best represented with one approximation. Areas in a video image that are in motion are best represented with a different approximation. A motion adaptive deinterlacer attempts to detect motion so as to choose the correct approximation in a spatially localized area. An incorrect decision of motion in a video image results in annoying visual artifacts in the progressive output thereby providing an unpleasant viewing experience. Several designs have attempted to find a solution for this problem but storage and processing constraints limit the amount of spatial and temporal video information that may be used for motion detection.

Frame rate defines how many pictures or frames of video information are displayed per second and the general units are frames per second (fps). In general, movies are shot at a frame rate of 24 fps. However, the standard promulgated in the United States by the National Television System Committee (NTSC) requires that information be displayed at a frame rate of 29.97 fps. Accordingly, the frame rate of movies shot at 24 fps must be changed in order to for them to be correctly displayed on NTSC compliant televisions. This process of changing the frame rate of movies from 24 fps to 29.97 fps is called telecine. Inverse telecine (IVTC) is the process utilized to transform movies from NTSC's frame rate of 29.97 fps back to a frame rate of 24 fps.

During deinterlacing, moving edges, especially edges of low-angle (near-horizontal edges), can produce an annoying artifact of the appearance of "jaggies." Previous systems did not provide a good solution of detecting and correcting jaggies. Some angle detectors are capable of handling edges with relatively steep angles (near-vertical) but for those angles that are closer to horizontal, many detectors fail to "see" the angled edge which results in the jaggy artifacts.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reducing the appearance of jaggies when deinterlacing moving edges, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 9B is a flow diagram that illustrates exemplary steps for low-angle edge detection, in accordance with an embodiment of the invention.

FIG. 11 illustrates an exemplary situation where the bound check may be useful, in accordance with an embodiment of the present invention.

FIG. 12 illustrates a closer detail of the erroneous output pixel "O" when no bound check is used.

FIG. 13 illustrates an exemplary result of using bound check 1 to test surrounding pixels.

FIG. 14A illustrates a situation in which it may be safe to allow a relatively large dead zone.

FIG. 14B illustrates a situation where a vertical object (black) may be bisecting a diagonal edge.

FIG. 17A-D illustrate various situations of a black thin line on a white background.

DETAILED DESCRIPTION OF THE INVENTION

Certain embodiments of the present invention relate to processing video. More specifically, certain embodiments of the invention relate to a method and system for reducing the appearance of jaggies when deinterlacing moving edges. While the following discusses detecting a direction of an edge at a low-angle, it should be understood that an embodiment of the present invention may detect all angles, including low angles.

Figure 1:
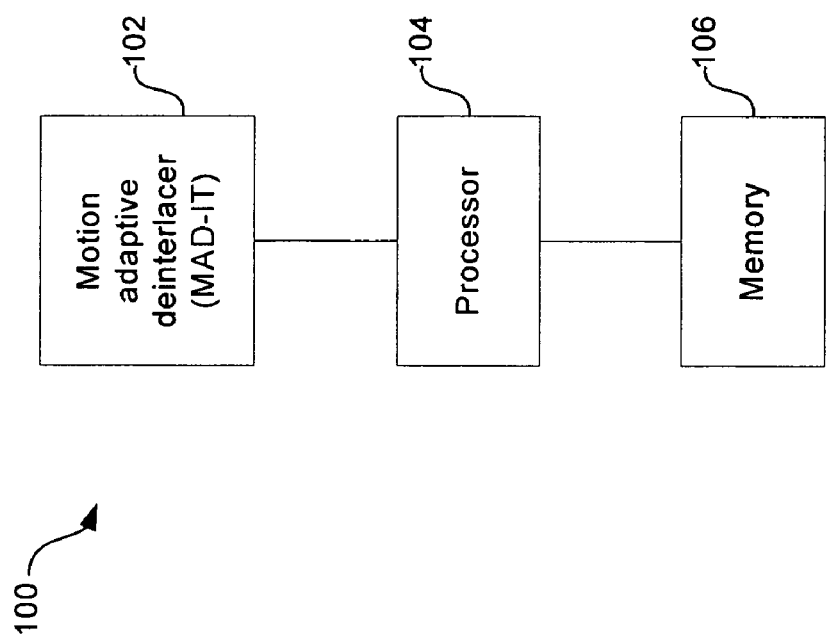
FIG. 1 illustrates a block diagram of an exemplary architecture for positioning of a motion adaptive deinterlacer, in accordance with an embodiment of the present invention.

FIG. 1 illustrates a block diagram of an exemplary architecture for positioning of a motion adaptive deinterlacer, in accordance with an embodiment of the present invention. Referring to FIG. 1, the deinterlacer system 100 may comprise a motion adaptive deinterlacer with inverse telecine (MAD-IT) 102, a processor 104, and a memory 106. The MAD-IT 102 may comprise suitable logic, code, and/or circuitry that may be adapted to deinterlace video fields. The processor 104 may comprise suitable logic, code, and/or circuitry that may be adapted to control the operation of the MAD-IT 102 and to transfer control information and/or data to and from the memory 106. The memory 106 may comprise suitable logic, code, and/or circuitry that may be adapted to store control information, data, information regarding current video fields, and/or information regarding prior video fields.

The MAD-IT 102 may be capable of reverse 3:2 and 2:2 pull-down and 3:2 and 2:2 pull-down cadence detection which may be utilized in a video network (VN). The MAD-IT 102 may be adapted to acquire interlaced video fields from one of a plurality of video sources in the video network and convert the acquired interlaced video fields into progressive frames, at double the display rate, in a visually pleasing manner.

The MAD-IT 102 may be adapted to accept interlaced video input and to output deinterlaced or progressive video to a video bus utilized by the video network. The MAD-IT 102 may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field-by-field basis up to, for example, a width of 720. The MAD-IT 102 may be adapted to smoothly blend various approximations for the missing pixels to prevent visible contours produced by changing decisions. A plurality of fields of video may be utilized to determine motion. For example, in an embodiment of the present invention, five fields of video may be utilized to determine motion. The MAD-IT 102 may produce stable non-jittery video with reduced risk of visual artifacts due to motion being misinterpreted while also providing improved still frame performance. The MAD-IT 102 may also provide additional fields per field type of quantized motion information, which may be selectable in order to reduce the risk of misinterpretation. For example, up to three (3) additional fields or more, per field type, of quantized motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided that reduces or eliminates jaggies in moving diagonal edges. The MAD-IT 102 may provide reverse 3:2 pull-down for improved quality from film-based sources. The MAD-IT 102 may also be adapted to support a variety of sources.

In operation, the MAD-IT 102 may receive interlaced fields and may convert those interlaced fields into progressive frames, at double the display rate. A portion of the information regarding fields that occurred prior to the current field being deinterlaced may be stored locally in the MAD-IT. A portion of the information regarding fields that occurred after the current field being deinterlaced may also be stored locally in the MAD-IT. A remaining portion of the information regarding fields that occurred prior to and after the current field may be stored in the memory 106.

The processor 104 may control the operation of the MAD-IT 102, for example, it may select from a plurality of deinterlacing algorithms that may be provided by the MAD-IT 102. The processor 104 may modify the MAD-IT 102 according to the source of video fields. Moreover, the processor 104 may transfer to the MAD-IT 102, information stored in the memory 106. The processor 104 may also transfer to the memory 106 any field-related information not locally stored in the MAD-IT 102. The MAD-IT 102 may then use information from the current field, information from previously occurring fields, and information from fields that occurred after the current field, to determine a motion-adapted value of the output pixel under consideration.

Figure 2:
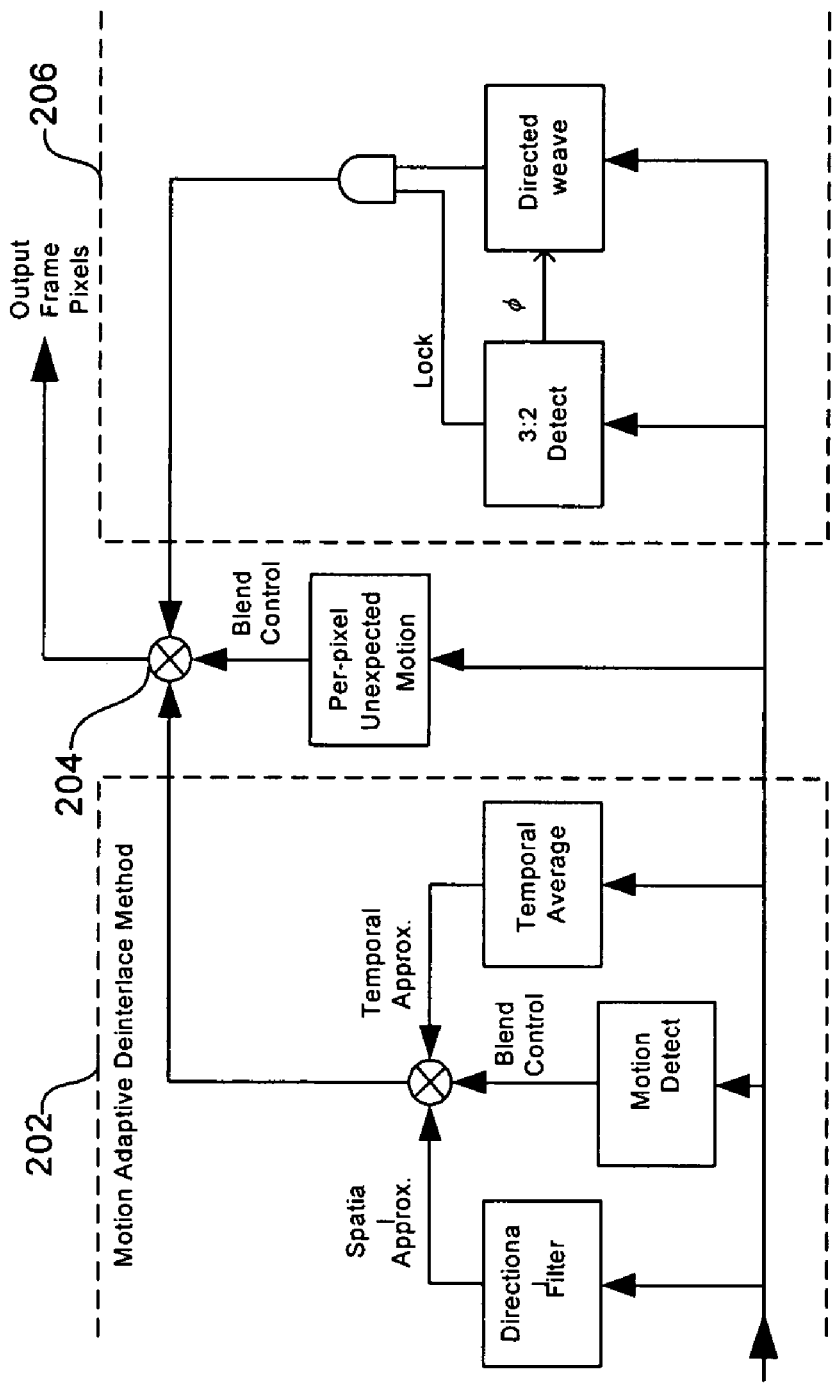
FIG. 2 illustrates a block diagram of an exemplary flow of the algorithm, which may be utilized by the MAD-IT in FIG. 1, in accordance with an embodiment of the present invention.

FIG. 2 illustrates a block diagram of an exemplary flow of the algorithm, which may be utilized by the MAD-IT in FIG. 1, in accordance with an embodiment of the present invention. Referring to FIG. 2, there is shown a data flow corresponding to the algorithm utilized for deinterlacing the luma (Y) component of video. The algorithm may effectively be divided into two halves. For example, diagrammed on the left portion of FIG. 2 is the motion adaptive deinterlacer (MAD) method 202 of deinterlacing and on the right portion, there is shown the reverse 3:2 pulldown method 206 of deinterlacing. For every output pixel, the MAD method 202, the reverse 3:2 pulldown method 206, or a blend 204 of the MAD method 202 and the reverse 3:2 pulldown method 206 may be utilized in order to determine a motion-adapted value of the output pixel under consideration.

Figure 3:
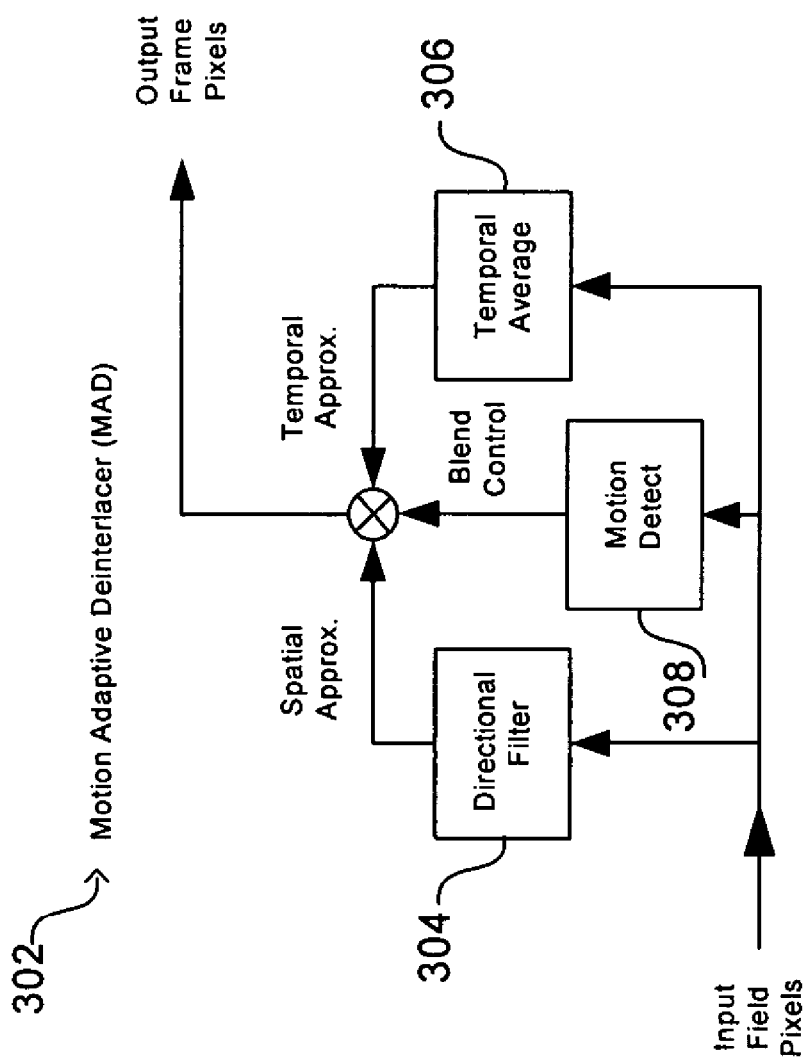
FIG. 3 illustrates an exemplary motion adaptive deinterlacer, in accordance with an embodiment of the present invention.

FIG. 3 illustrates an exemplary motion adaptive deinterlacer, in accordance with an embodiment of the present invention. The motion adaptive deinterlacer (MAD) 302 may comprise a directional filter 304, a temporal average 306, and a blender 308. The directional filter 304 may comprise suitable logic, code, and/or circuitry that may be adapted for spatially approximating the value of the output pixel. The temporal average 306 may comprise suitable logic, code, and/or circuitry that may be adapted for temporal approximation of the value of the output pixel. The blender 308 may comprise suitable logic, code, and/or circuitry that may be adapted to combine the temporal and spatial approximations of the value of the output pixel.

In operation, the MAD 302 may be used to perform the MAD method 202 of deinterlacing shown in FIG. 2. The MAD 302 may receive input field pixels from an interlaced video field and convert them into output frame pixels in a progressive frame, at double the display rate. The horizontal resolution of the input to the MAD 302 may change on a field-by-field basis. The MAD 302 may utilize a motion adaptive algorithm that may smoothly blend various approximations for the output pixels to prevent visible contours, which may be produced by changing decisions. In an embodiment of the present invention, it may be necessary to determine the amount of motion around each output pixel, to use an appropriate approximation for the output pixel. The MAD 302 may utilize the directional filter 304, the temporal average 306, and the blender 308 to obtain a motion-adapted value for the output pixel that is visually pleasing.

Figure 4:
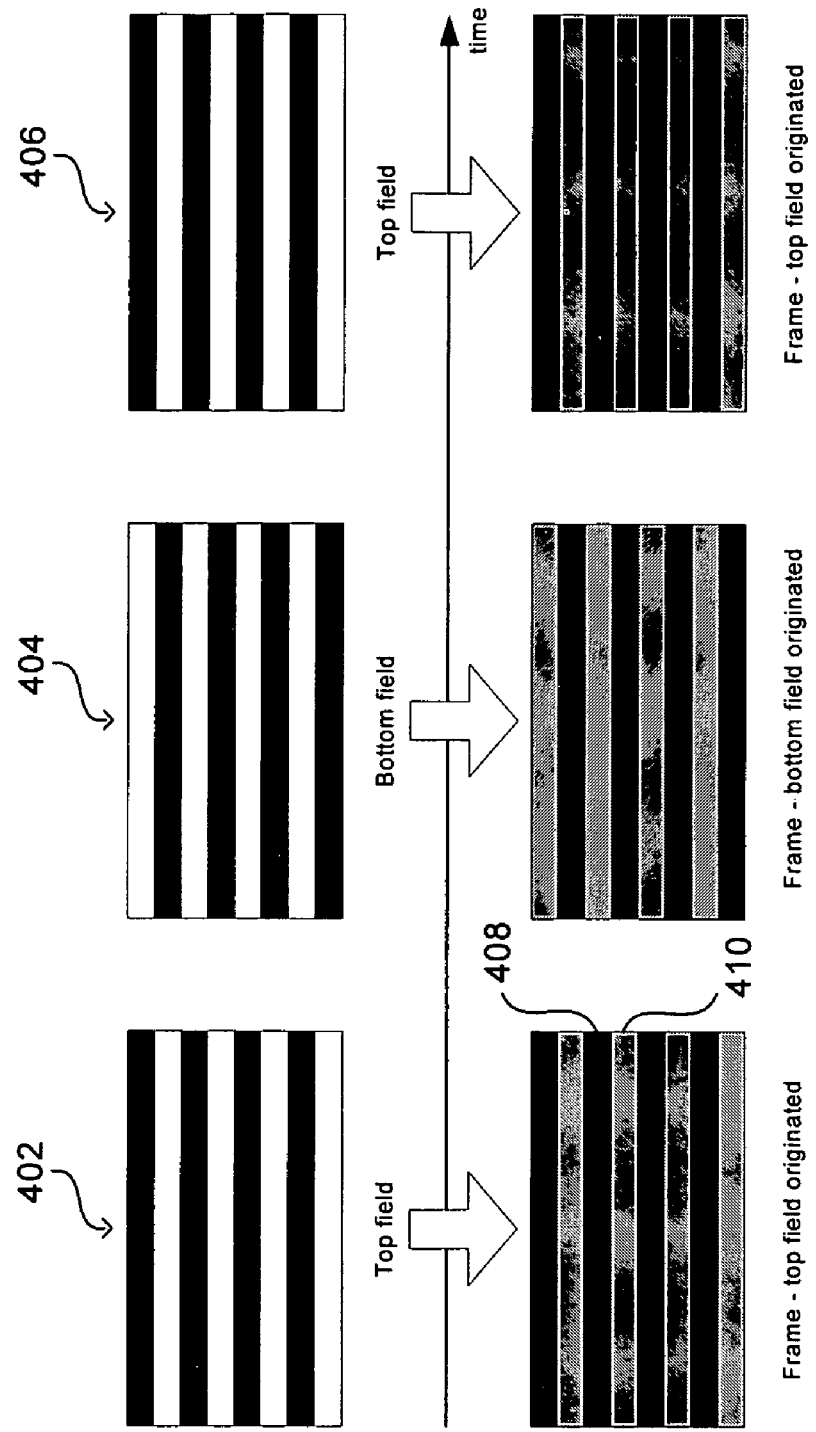
FIG. 4 illustrates an exemplary input and output of a deinterlacer, in accordance with an embodiment of the present invention.

FIG. 4 illustrates an exemplary input and output of a deinterlacer, in accordance with an embodiment of the present invention. Referring to FIG. 4, three fields are presented to the deinterlacer. The first field 402 is a top field, the second field 404 is a bottom field, and the third field 406 is a top field again. The first field 402 may be a bottom or top field, and the sequence of fields may alternate between top and bottom as appropriate depending on the first field 402. The deinterlacer may take the present lines in the field (black-colored lines in FIG. 4) and fill in the absent lines (clear lines in FIG. 4) to produce an output frame. The process of deinterlacing may be seen as taking one present line of pixels from the source field and producing two output lines of pixels. One line is the line that came from the source field and may be called the "present" line (black). An exemplary present line 408 is shown in FIG. 4 for the frame that originated from the first field 402. The other line is the line that needs to be created and may be called the "absent" line (hatched lines). An exemplary absent line 410 is shown in FIG. 4 for the frame that originated from the first field 402. This double output line pattern may then repeat to create the output frame. The pixels of the absent line may be computed using a deinterlacing procedure in accordance with an embodiment of the present invention. A line of present pixels may be output in parallel with a line of absent pixels. The two lines of output may make up the progressive frame lines.

Figure 5:
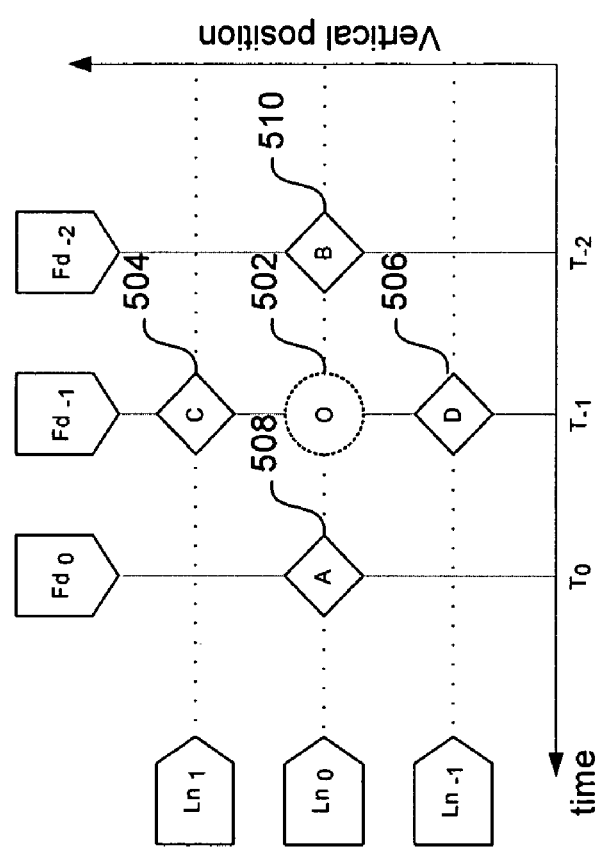
FIG. 5 illustrates an exemplary simple pixel constellation.

FIG. 5 illustrates an exemplary simple pixel constellation. Referring to FIG. 5, the current output field under consideration is a field $Fd_{-1}$ at time $T_{-1}$ and the current absent line to be determined is a line $Ln_0$. The most recent field to occur is a field $Fd_0$ at time $T_0$ and the earliest field shown is a field $Fd_{-2}$ at time $T_{-2}$. Generally, except for the first and last output lines of a frame, there will always be a present line $Ln_1$ of known pixels above and another present line $Ln_{-1}$ of known pixels below the absent line $Ln_0$ to be determined. Looking forward and backwards in time to the fields $Fd_0$ and $Fd_{-2}$ adjacent to the field $Fd_{-1}$, there will be present lines of known pixels at the same vertical position as the absent line $Ln_0$ currently being determined. Referring back to FIG. 5, each output pixel (O) 502 to be calculated in the absent line $Ln_0$, may be treated individually. Then, there will be one pixel above (C) 504 in present line $Ln_1$ of field $Fd_{-1}$, one pixel below (D) 506 in present line $Ln$, of field $Fd_{-1}$, one pixel occurring forward in time (A) 508 in present line $Ln_0$ of field $Fd_0$, and one pixel occurring backwards in time (B) 510 in present line $Ln_0$ of field $Fd_{-2}$.

Each output frame generated by deinterlacing may have a height H and a width W, and for equations hereinafter, t will represent the time index, i will represent the height index where $0 \leq i \leq H$, and j will represent the width index where $0 \leq j \leq W$. For an output frame originated by a top field such as, for example, top field 402 or 406 in FIG. 4, when i MOD 2=0, the pixels in a line are provided from a present line in a source field, and when i MOD 2=1 the line corresponds to an absent line and the pixels in that line are determined. Conversely, in an output frame originated by a bottom field such as, for example, bottom field 404 in FIG. 4, when i MOD 2=1 the pixels in a line are provided from a present line in a source field, and when i MOD 2=0 the line corresponds to an absent line and the pixels in that line are determined.

A motion adaptive deinterlacer creates an estimated value of output pixel O 502 by determining how much "motion" is present. Motion in this context refers to a pixel in a given spatial location changing over time. The motion may be due to, for example, objects moving or lighting conditions changing.

Figure 6:
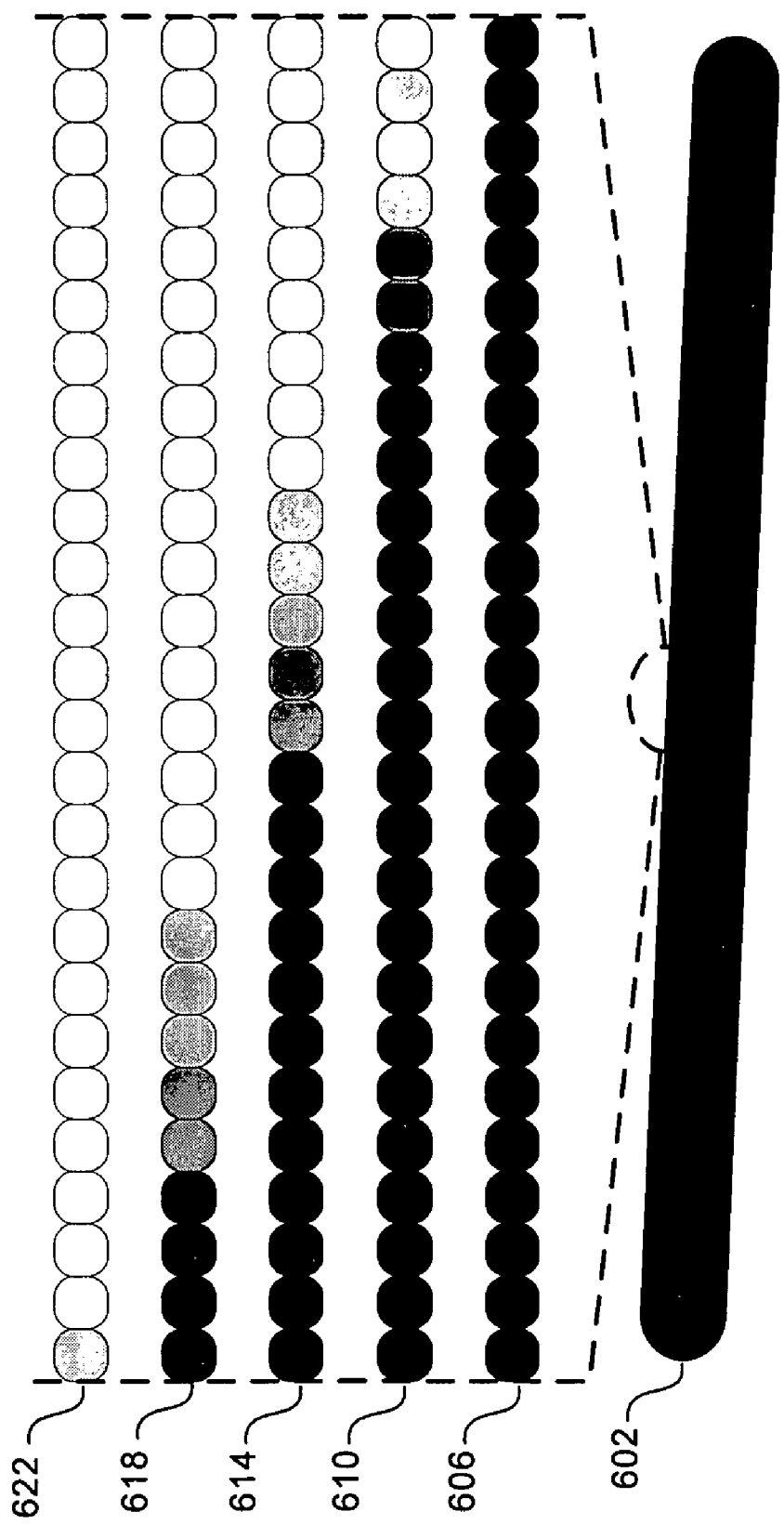
FIG. 6 illustrates a close view of a low-angle edge in an interlaced field.

FIG. 6 illustrates a close view of a low-angle edge 602 in an interlaced field. The intensity of the edge may fade from black to white from left to right across the edge 602 as illustrated by the exploded view of a small portion of the edge 602. The pixels may be spaced out vertically since these are the pixels of the current field with the present pixels in horizontal lines 606, 610, 614, 618, and 622. During deinterlacing, the MAD may create the missing absent pixels between the present pixels, and therefore the MAD may use the present pixels in this current field in processing the edge 602.

Figure 7:
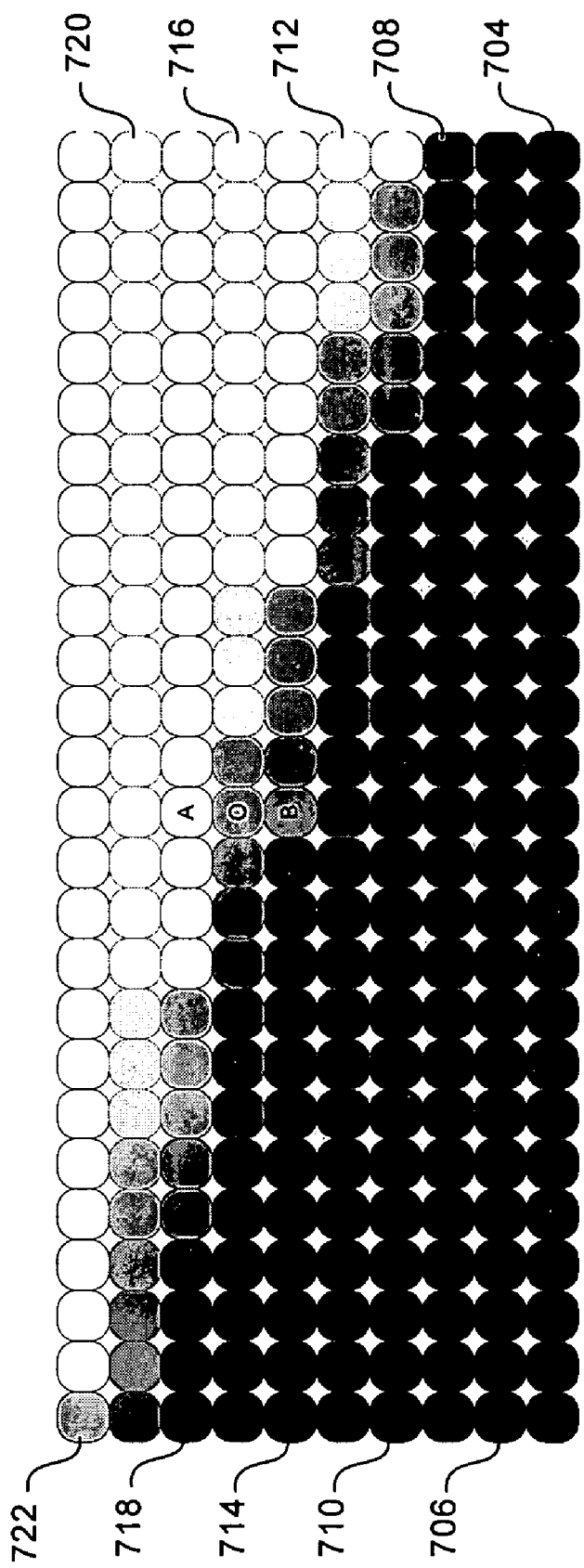
FIG. 7 illustrates a close view of a low-angle edge spatially deinterlaced using a vertical filter.

FIG. 7 illustrates a close view of a low-angle edge spatially deinterlaced using a vertical filter. A simple vertical filter may be used to interpolate the absent pixels in the horizontal lines 704, 708, 712, 716, and 720, from the supplied present pixels in the horizontal lines 706, 710, 714, 718, and 722. For example, absent pixel O in absent horizontal line 716 may be generated from present pixels A and B from present horizontal lines 714 and 718, respectively. While the edge 602 of FIG. 6 may appear regular, the deinterlaced version of the edge in FIG. 7 looks jaggy. To reduce the appearance of the jaggies in the edge, the direction of the edge may be determined and pixels to the left and right of A and B may be brought into the calculation of "O." The range of the angle detector may be widened to be able to recognize the presence of the near horizontal edge. Using an angle detector with a limited view, the localized edge may appear to be purely horizontal, and would give no indication as to which way a filter needs to be applied, and jaggies will result as shown in FIG. 7. Given the alternating spatial location of the samples between top and bottom field originated output frames, as the object moves over time, and with improper processing, the jaggies may appear to stream up or down along the near horizontal edges.

Figure 8:
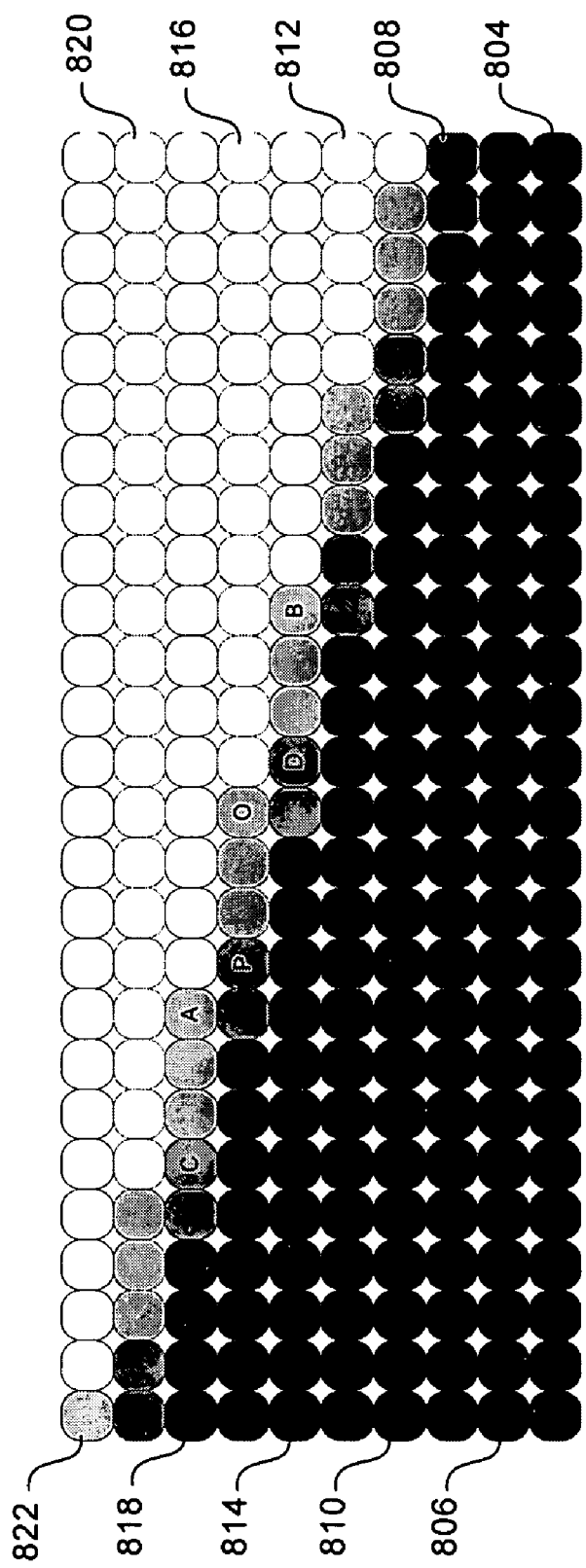
FIG. 8 illustrates a close view of a low-angle edge spatially deinterlaced to prevent jaggies, in accordance with an embodiment of the present invention.

FIG. 8 illustrates a close view of a low-angle edge spatially deinterlaced to prevent jaggies, in accordance with an embodiment of the present invention. The output of the deinterlacer may comprise the supplied present pixels in the horizontal lines 806, 810, 814, 818, and 822 and the produced absent pixels in the horizontal lines 804, 808, 812, 816, and 820. For example, absent pixel O in absent horizontal line 816 may be generated from present pixels A and B from present horizontal lines 814 and 818, respectively. The pixel A may be as many pixels to the left of O as B is to the right, instead of being directly above and below O, respectively, as in the example associated with FIG. 7. Similarly, P may be another absent pixel in absent horizontal line 816 determined from present pixels C and D from present horizontal lines 814 and 818, respectively. Just as in the shown exemplary "A-O-B" case, C may be, for example, four pixels to the left and D is four pixels to the right of P.

Therefore, for determining the absent pixels in the vicinity of the low-angle edge, the deinterlacer may use the present pixel above and four to the left along with the present pixel below and four to the right. The number of pixels over to the right or left of the absent pixel, four in this example, may depend on the angle at which the low-angle edge lies. As illustrated by FIG. 8, the low-angle edge in this case the pixels of similar location in the present horizontal lines are displaced by 8 pixels, therefore, to determine the absent pixels, the present pixel 4 pixels to the left and above and the present pixel 4 pixels to the right and below may be used to determine the absent pixels. Therefore, the initial step in determining the absent pixels for a low-angle edge may be to determine the "angle" of the edge. The angle may be determined in terms of displacement in the positioning of the pixels in the present pixels such as, for example, 8 pixels as illustrated by the exemplary low-angle edge of FIG. 8. Determining an absent pixel such as, for example, pixel O using present pixels A and B may be as simple as:

$$O = \frac{A+B}{2}$$

Figure 9A:
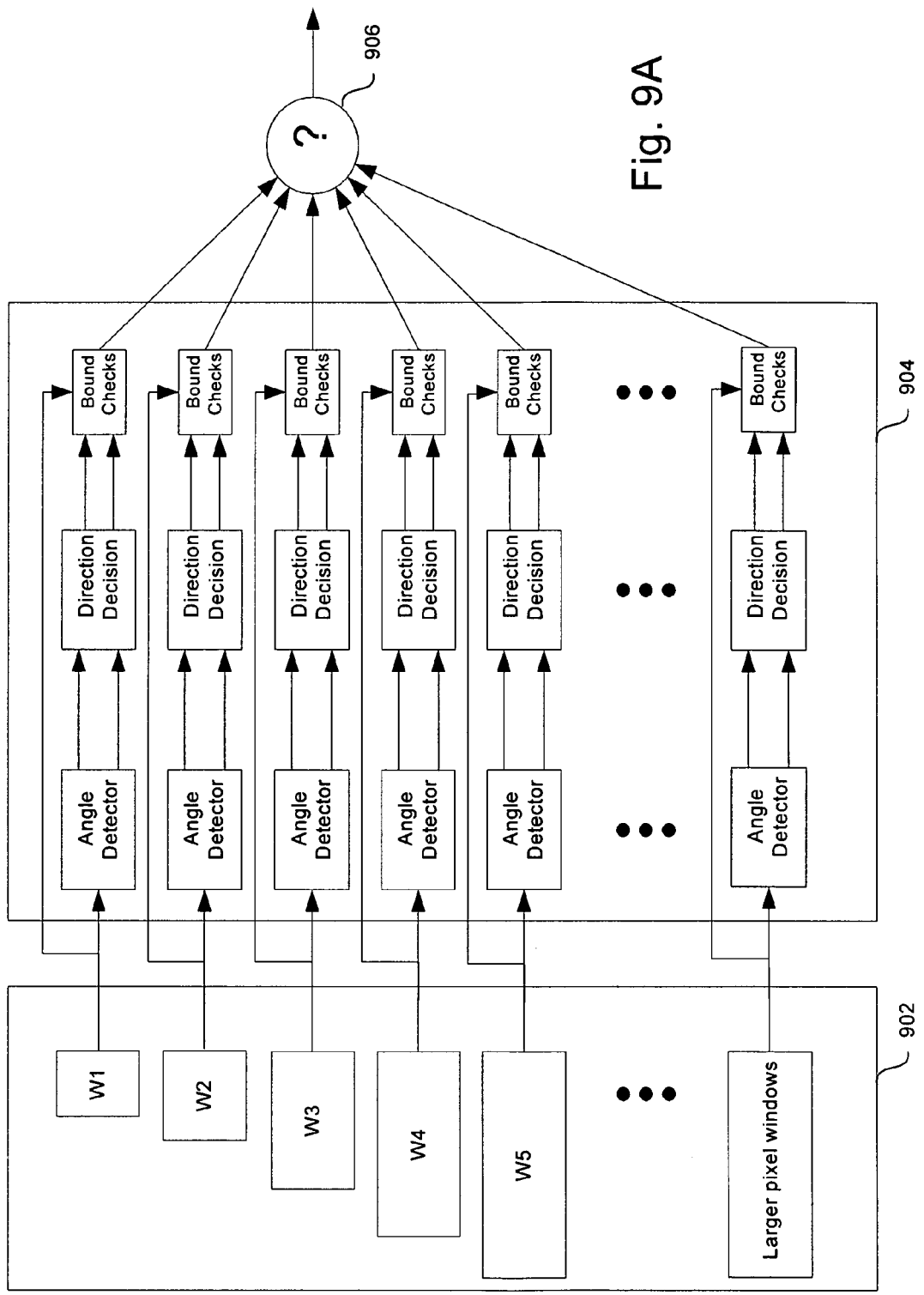
FIG. 9A illustrates an exemplary structure of a low-angle algorithm, in accordance with an embodiment of the present invention.

FIG. 9A illustrates an exemplary structure of a low-angle algorithm, in accordance with an embodiment of the present invention. The structure of the low-angle algorithm may comprise input 902, angle detector 904, and an angle decision block 906. The input 902 may comprise multiple inputs each of which may be a window of pixels in the center of which may be the absent pixel O, which may be the current absent pixel to be determined. Each window may comprise a different number of pixels. For example, the window W1 may comprise a small number of pixels, and W2 may comprise a larger number of pixels than those in W1, and W3 may comprise a larger number of pixels than those in W2, and so on.

The angle detector 904 may comprise a plurality of angle detectors, direction decisions, and bound checks, the number of each of which may be equivalent to the number of windows of pixels of input 902. Each of the angle detectors may examine the present pixels within a window and look for an angle within the window. Each of the angle detectors may have two outputs comprising the positive angle difference and the negative angle difference, which may be input into each of the associated direction decision block. Each of the direction decisions may then produce a measure indicating the strength of the edge associated with the angle within the window. More specifically, each of the direction decisions may have two outputs comprising a measure of the angle strength and angle direction. The bound checks may then check the bounds of the edge found in the associated window using the measure of the angle strength and angle direction to output a modified angle strength and angle direction. The bound checks may examine the pixels surrounding the detected edge at the determined direction and determine whether they seem to fit an edge at that angle. The strength of the edge measure may then be modified based on the result of the bound checks. The results from all the detectors may then be examined and a decision may be made as to which direction to filter pixels in order to produce the spatial approximation for O in the angle decision block 906. Temporal and inverse telecine approximations may also be produced for O and the final output pixel may be a blend using the best approximations for the particular situation of that pixel. Temporal and inverse telecine approximations are discussed further in U.S. patent application Ser. No. 11/026,369, filed Dec. 30, 2004. Accordingly, U.S. patent application Ser. No. 11/026,369, filed Dec. 30, 2004, is incorporated herein by reference in its entirety.

The windows of pixels used in the input 902 may have different edge directions associated with them. Since the first window, W1, is a small window of pixels, the edge direction may be detected as near vertical, while the edge direction in the last window with the large number of pixels may be detected as near horizontal. Additionally, the window of influence of pixels (i.e. those pixels that can contribute to the output of the associated detector) may start small for high angles (near vertical, associated with W1) and progressively increase for lower angles.

FIG. 9B is a flow diagram that illustrates exemplary steps for low-angle edge detection, in accordance with an embodiment of the invention. After a starting step 950, an interlaced video image may be received by the deinterlacer at a step 952. The deinterlacer may be used to approximate the absent pixels such as, for example, pixel O of FIG. 8. At a next step 954, windows of pixels from the interlaced image may be produced, in the center of each of which may be the absent pixel O, which may be the current absent pixel to be determined. Each window may comprise a different number of pixels. For example, a window W1 may comprise a small number of pixels, and a window W2 may comprise a larger number of pixels than those in W1, and a window W3 may comprise a larger number of pixels than those in W2, and so on. At a next step 956, each of the windows may be examined to determine an angle associated with the edge within each window, to produce two outputs comprising the positive angle difference and the negative angle difference. The two angle measures may then be used at a next step 958 to produce a measure indicating the strength of the edge associated with the angle within the window. More specifically, two outputs may be produced comprising a measure of the angle strength and angle direction. The pixels surrounding the detected edge may then be examined at a next step 960 along the determined direction to determine whether the surrounding pixels fit the edge at that angle. The strength of the edge measure may then be modified based on the result of examining the surrounding pixels at a next step 962. The results from all the windows may then be examined and a decision may be made as to which direction to filter pixels in order to produce the spatial approximation for pixel O at a last step 964.

Figure 10:
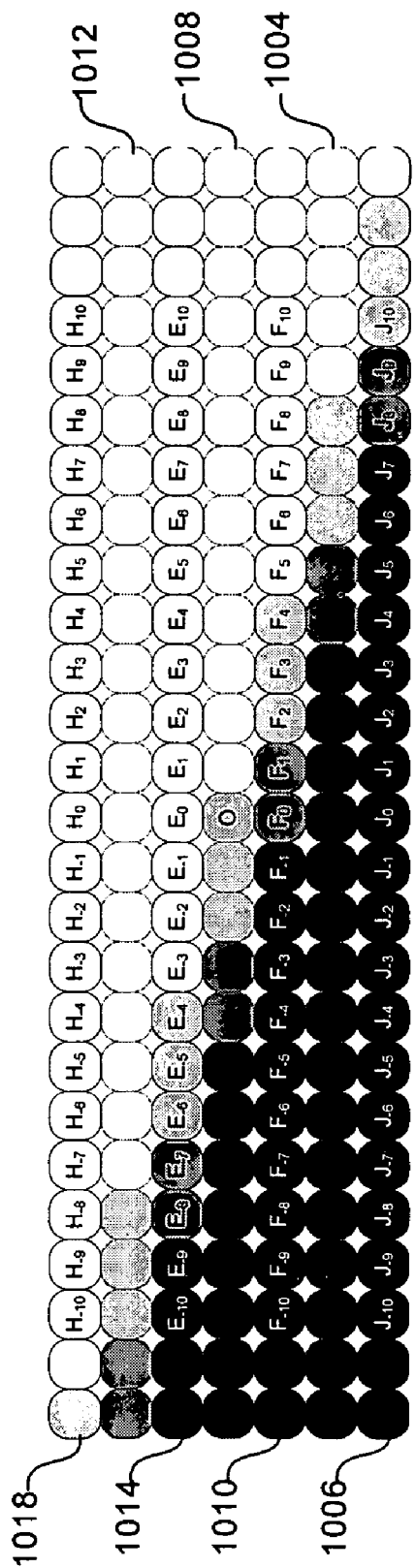
FIG. 10 illustrates an exemplary window of pixels used for a "4×" detector and an edge that fits that angle, in accordance with an embodiment of the present invention.

Angle detectors may vary, where each angle detector may be looking for an edge at its particular angle in the associated window. FIG. 10 illustrates an exemplary window of pixels used for a "4×" detector and an edge that fits that angle, in accordance with an embodiment of the present invention. In this example, given a current output pixel to be determined, O in absent horizontal line 1008, the pixels above and below from present horizontal lines 1010 and 1014, four to the left and right ($E_{-4}$ and $F_4$) lie along the direction of the edge and may be suitable to be used as predictors for O. This angle of approximately 14 degrees may be termed 4× in the positive direction. An edge from bottom left to top right with the same angle may be termed 4× in the negative direction.

To find an edge in the positive direction, the 4× detector may expect the difference abs($E_{-4}$-$F_4$) to be small. All differences staggered at the same angle in the vicinity of the edge may similarly be small. So abs($E_{-5}$-$F_3$), abs($F_{-1}$-$J_7$), abs($H_2$-$E_{10}$), etc. similarly may all be expected to be small. The detector may be the sum of the absolute differences of the pixels spaced horizontally by the offset in question throughout the range of the pixel window.

Using the symbol θ to denote a general angle (the example detailed in FIG. 10 being θ=4×), the equations for most angles θ may fit a general form. Although, specific equations may be used for θ=0× and θ=0.5× (vertical and near-vertical).

For the general case where θ≠0×, θ≠0.5×, the following equations may be used for the luma component of the pixel O:

$$\text{angle\_diff\_pos\_Y}(i, j, \theta) = \sum_{y=-2,0,+2} \sum_{x=-range(\theta)}^{range(\theta)} |Y(t-3, i+y-1, j-\theta+x) - Y(t-3, i+y+1, j+\theta+x)|$$

$$\text{angle\_diff\_neg\_Y}(i, j, \theta) = \sum_{y=-2,0,+2} \sum_{x=-range(\theta)}^{range(\theta)} |Y(t-3, i+y-1, j+\theta+x) - Y(t-3, i+y+1, j-\theta+x)|$$

Which, in terms of the pixel constellation around the current output, absent pixel O, may become:

$$\text{angle\_diff\_pos\_Y}(i, j, \theta) =$$

$$\sum_{x=-range(\theta)}^{range(\theta)} |E_{x-\theta} - F_{x+\theta}| + \sum_{x=-range(\theta)}^{range(\theta)} |H_{x-\theta} - E_{x+\theta}| + \sum_{x=-range(\theta)}^{range(\theta)} |F_{x-\theta} - J_{x+\theta}|$$

$$\text{angle\_diff\_neg\_Y}(i, j, \theta) =$$

$$\sum_{x=-range(\theta)}^{range(\theta)} |E_{x+\theta} - F_{x-\theta}| + \sum_{x=-range(\theta)}^{range(\theta)} |H_{x+\theta} - E_{x-\theta}| + \sum_{x=-range(\theta)}^{range(\theta)} |F_{x+\theta} - J_{x-\theta}|$$

In the example of FIG. 10 above, θ=4, range =5 and it may be expected that angle_diff_pos_Y for the (i,j) location of O may be small in magnitude. Relative to angle_diff_pos_Y, angle_diff_neg_Y may be expected to compute to a larger value.

For the case where θ=0×, the following equations may be used for the luma component of the pixel O, in terms of the pixel constellation around the pixel O:

$$\text{angle\_diff\_vert\_Y}(i,j,\theta=0\times) = |E_{-1} - F_{-1}| + |E_0 - F_0| + |E_1 - F_1|$$

$$\text{angle\_diff\_horiz\_Y}(i,j,\theta=0\times) = |E_{-1} - E_0| + |E_0 - E_1| + |F_{-1} - F_0| + |F_0 - F_1|$$

For the case where θ=0.5×, the following equations may be used for the luma component of the pixel O, in terms of the pixel constellation around the pixel O, for the positive direction difference:

$$\text{angle\_diff\_pos\_Y}(i, j, \theta = 0.5x) = |H_{-2} - E_{-1}| + |H_{-1} - E_0| +$$
$$|H_0 - E_1| + |H_1 - E_2| + |E_{-2} - F_{-1}| + |E_{-1} - F_0| + |E_0 - F_1| +$$
$$|E_1 - F_2| + |F_{-2} - J_{-1}| + |F_{-1} - J_0| + |F_0 - J_1| + |F_1 - J_2|$$

or equivalently:

$$\text{angle\_diff\_pos\_Y}(i, j, \theta = 0.5x) =$$

$$\sum_{x=-1}^{2} |E_{x-1} - F_x| + \sum_{x=-1}^{2} |H_{x-1} - E_x| + \sum_{x=-1}^{2} |F_{x-1} - J_x|$$

and for the negative direction difference:

$$\text{angle\_diff\_neg\_Y}(i, j, \theta = 0.5x) = |E_{-2} - H_{-1}| + |E_{-1} - H_0| +$$
$$|E_0 - H_1| + |E_1 - H_2| + |F_{-2} - E_{-1}| + |F_{-1} - E_0| + |F_0 - E_1| +$$
$$|F_1 - E_2| + |J_{-2} - F_{-1}| + |J_{-1} - F_0| + |J_0 - F_1| + |J_1 - F_2|$$

or equivalently:

$$\text{angle\_diff\_neg\_Y}(i, j, \theta = 0.5x) =$$

$$\sum_{x=-1}^{2} |F_{x-1} - E_x| + \sum_{x=-1}^{2} |E_{x-1} - H_x| + \sum_{x=-1}^{2} |J_{x-1} - F_x|$$

For the general case where θ≠0×,θ≠0.5×, the following equations may be used for the chroma component of the pixel O:

$$\text{angle\_diff\_pos\_U}(i, j, \theta) = \sum_{\substack{y=2,0,+2}}^{range(\theta)} \sum_{\substack{x=-range(\theta) \\ (j-\theta+x)even}} |U(t-3, i+y-1, j-\theta+x) - U($$

$$t-3, i+y+1, j+\theta+x)|$$

$$\text{angle\_diff\_neg\_U}(i, j, \theta) = \sum_{y=-2,0,+2} \sum_{\substack{x=-range \\ (j+\theta+x)even}}^{range} |U(t-3, i+y-1, j+\theta+x) -$$

$$U(t-3, i+y+1, j-\theta+x)|$$

$$\text{angle\_diff\_pos\_V}(i, j, \theta) = \sum_{y=-2,0,+2} \sum_{\substack{x=-range(\theta) \\ (j-\theta+x)even}}^{range(\theta)} |V(t-3,$$

$$i+y-1, j-\theta+x) - V(t-3, i+y+1, j+\theta+x)|$$

$$\text{angel\_diff\_neg\_V}(i, j, \theta) = \sum_{y=-2,0,+2} \sum_{\substack{x=-range(\theta) \\ (j+\theta+x)even}}^{range(\theta)} |V(t-3,$$

$$i+y-1, j+\theta+x) - V(t-3, i+y+1, j-\theta+x)|$$

It should be noted that the chroma component may be optionally used in the angle detector. The same approach may be taken for each chroma component as for luma but the sum may include samples at 4:2:2 chroma locations (i.e. at even pixel locations only). Additionally, in relatively dark areas of the image, chroma components may vary wildly while the actual visible edge may be very small or non-existent. Therefore, the chroma components may be conditionally accumulated when the corresponding luma is above a programmable threshold. The details of this are presented hereinafter.

For the case where $\theta=0\times, \theta=0.5\times$, considering the relatively coarse horizontal sampling density of 4:2:2 chroma, very little information of changing colors may be available for the $\theta=0\times$, and $\theta=0.5\times$ directions. Therefore, chroma may not be considered for these two directions and for the purposes of consistency of equations, the following may be used:

angel_diff_pos_$U(i,j,\theta=0\times,0.5\times)$=angle_diff_neg_$U$
$(i,j,\theta=0\times,0.5\times)=0$ angel_diff_pos_$V(i,j,\theta=0\times, 0.5\times)$=angle_diff_neg_$V$
$(i,j,\Gamma=0\times,0,5\times)=0$ The final angle measures in the positive and negative directions may be simply the sums of the luma and chroma components:

angle_diff_pos$(i,j,\theta)$=angle_diff_pos_$Y(i,j, \theta)$+angle_diff_pos_$U(i,j, \theta)$+angle_diff_pos_$V(i,j, \theta)$ angle_diff_neg$(i,j, \theta)$=angle_diff_neg_$Y(i,j, \theta)$+angle_diff_neg_$U(i,j, \theta)$+angle_diff_neg_$V(i,j, \theta)$ For the general case of $\theta \neq 0\times$, and for each angle detector, angle_diff_pos$(i,j,\theta)$ may be compared against angle_diff_neg$(i,j,\theta)$ to determine which general direction may best suit the given angle detector. This may be achieved by the following pseudo code:

if(angle_diff_pos$(i,j,\theta)$ < angle_diff_neg$(i,j,\theta)$)
   angle_dir$(i,j,\theta)$ = POSITIVE
   angle_strength$(i,j,\theta)$ = scale$(\theta)\times$
     {angle_diff_neg$(i,j,\theta)$ − DIR_RATIO × angle_diff_pos$(i,j,\theta)$}
else -continued angle_dir$(i,j,\theta)$ = NEGATIVE
   angle_strength$(i,j,\theta)$ = scale$(\theta)\times$
     {angle_diff_pos$(i,j,\theta)$ − DIR_RATIO × angle_diff_neg$(i,j,\theta)$}
Where
   angle_dir$(i,j,\theta)$ = POSITIVE implies a general direction of top-left-to-bottom-right and
   angle_dir$(i,j,\theta)$ = NEGATIVE implies bottom-left-to-top-right.

The values scale ($\theta$) may be programmable for each angle detector. They may be used to scale the angle_strength$(i,j,\theta)$ relative to all the detectors such that they may be directly compared. This may be useful since the nearer vertical detectors may involve fewer pixels and hence a smaller possible accumulation than the nearer horizontal detectors.

The DIR_RATIO may be a programmable value common to all angle detectors except north (vertical). This value may allow a degree of control over how different the positive and negative diff measurements need to be to give a strong measurement for this edge. A larger DIR_RATIO may make the detector more conservative since it may imply the difference between the two diff measurements needs to be larger before angle_strength$(i,j,\theta)$ will give a large positive measure.

Comparing the difference measure along the direction of an edge against a difference measure perpendicular to the direction of the edge would give an indication of how well matched and distinct the edge is. Calculating a difference perpendicular to the edge, however, is expensive to do reliably when it is perpendicular to a near-horizontal edge since many pixels would need to be examined vertically. Also, thin edges might easily be missed completely by a near-vertical, perpendicular edge detector. Therefore, instead a comparison based on the difference taken at the same angle but opposite direction may be used. The angle_strength$(i,j,\theta)$ may give a measure of how strong an edge has been found in the general direction (positive or negative) the associated angle detector may have chosen. A large positive value for this measure may indicate that the associated angle detector may have observed a distinct edge at the particular angle to which it is sensitive. Small positive or negative measures may indicate either a weak edge (relatively small gradient perpendicular to the direction of the edge) or an edge at an angle different from the angle to which the associated detector is sensitive.

For the general case of $\theta=0\times$, (north) direction, there is no positive or negative direction decision to be made, then:

angle_strength$(i,j,\theta)$=scale$(\theta)\times${DIR_RATIO_NORTH×angle_diff_horiz$(i, j, \theta)$−angle_diff_vert$(i,j, \theta)$} where DIR_RATIO_NORTH may be a programmable value.

The table below shows exemplary range and default scale values for each of the angle detectors of FIG. 9:

| Angle - $\theta$ | Angle relative to horizontal | range ($\theta$) | scale ($\theta$) |
|---|---|---|---|
| 0x | 90.0° | — | 40.0 |
| 0.5x | 63.4° | — | 12.0 |
| 1x | 45.0° | 2 | 16.0 |
| 2x | 26.6° | 3 | 13.5 |
| 3x | 18.4° | 4 | 9.0 |
| 4x | 14.0° | 5 | 7.5 |
| 5x | 11.3° | 6 | 6.0 |
| 6x | 9.5° | 7 | 5.5 |
| 7x | 8.1° | 8 | 4.5 |
| 8x | 7.1° | 9 | 4.0 |
| 10x | 6.3° | 11 | 3.5 |

-continued

| Angle - θ | Angle relative to horizontal | range (θ) | scale (θ) |
|---|---|---|---|
| 12x | 4.8° | 13 | 3.0 |
| 14x | 4.1° | 15 | 2.5 |
| 16x | 3.6° | 17 | 2.5 |
| 22x | 2.6° | 23 | 1.5 |

FIG. 11 illustrates an exemplary situation where the bound check may be useful, in accordance with an embodiment of the present invention. This situation is known as the "M" case, in which the angle detectors on their own may get erroneous results. Given the present pixels of the source field 1102, the "correct" deinterlace result 1104 may not be achieved without using the bound check. Instead, the result may be the erroneous pattern 1106.

FIG. 12 illustrates a closer detail of the erroneous output pixel "O" when no bound check is used. Considering only luma in this example, it can be seen that the "2×" detector may give a zero reading in the negative direction and, assuming black pixels have a 0 value, and white pixels have a 255 value, the "2×" detector may give a reading of 1275 in the positive direction. As a result, using the equations above:

$$\text{angle\_diff\_pos}(i, j, 2) =$$

$$\sum_{x=-3}^{3} |E_{x-2} - F_{x+2}| + \sum_{x=-3}^{3} |H_{x-2} - E_{x+2}| + \sum_{x=-3}^{3} |F_{x-2} - J_{x+2}| =$$

$$5 \times 255 = 1275$$

$$\text{angle\_diff\_neg}(i, j, 2) =$$

$$\sum_{x=-3}^{3} |E_{x+2} - F_{x-2}| + \sum_{x=-3}^{3} |H_{x+2} - E_{x-2}| + \sum_{x=-3}^{3} |F_{x+2} - J_{x-2}| = 0$$

$$\Rightarrow \text{angle\_dir}(i, j, 2) = \text{NEGATIVE}$$

$$O = \frac{E_2 + F_{-2}}{2}$$

$$\Rightarrow O \text{ is a black pixel}$$

The difference between the positive and negative directions is suitably large and may well indicate that an edge has been found at the "2×" angle in the negative direction (bottom_left_to_top_right) and the absent pixel "O" will be black rather than white. More correctly, the absent pixel "O" should be determined from the "0×" (north) direction to ensure that it is white.

Other situations, as well as the "M" case, may occur where erroneous pixels may be produced. While the angle detectors give a great deal of information about the direction of any edge, further checks may be used to ensure that any direction the angle detectors advocate do fit the pattern of surrounding pixels.

FIG. 13 illustrates an exemplary result of using bound check 1 to test surrounding pixels. There is illustrated a situation with an edge of black pixels in the negative direction at an angle θ. If $E_θ$ and $F_{-θ}$ are part of an edge, then the pixels surrounding $E_θ$, $F_{-θ}$, and O may be predictably influenced by that edge. Parallel to the main edge running though $E_θ$, $F_{-θ}$, and O, $E_0$ may be expected to have intensity about halfway in between $E_{-θ\ and\ F-θ}$. Similarly, $F_0$ may be expected to have intensity about half way between $E_θ$ and $F_θ$. It may also be expected that the difference between $E_θ$ and $F_{-θ}$ may be small. The bound check 1 may calculate a numerical measure of how dissimilar to the expected pattern the surrounding pixels at the proposed angle may be. A small value may indicate the surrounding pixels fit well and a large value may imply that the surrounding pixels do not fit well.

The bound check 1 measure may calculate how far away from the midpoint of $E_{-θ\ and\ F-θ}$ is $E_0$; and similarly for $F_0$ with $E_θ$ and $F_θ$. The programmable dead zone may allow for a certain leeway around the midpoint within which the bound check 1 measure may not be increased. Any difference beyond the extent of the dead zone may be multiplied by a programmable gain factor to increase its significance. The extents of the dead zones may be bounded by the intensities of $E_{-θ}$ and $F_{-θ}$ (and $E_θ$ and $F_θ$). This may ensure that a sufficient penalty is entailed should $E_0$ or $F_0$ fall outside of its expected bounds. This may be done using the following equations:

$$\text{avg\_left} = \frac{E_{-θ} + F_{-θ}}{2}$$

$$\text{avg\_right} = \frac{E_θ + F_θ}{2}$$

$$\text{dz\_left} = \min\left(\text{bc1\_dz}, \left|\frac{E_{-θ} - F_{-θ}}{2}\right|\right)$$

$$\text{dz\_right} = \min\left(\text{bc1\_dz}, \left|\frac{E_θ - F_θ}{2}\right|\right)$$

When angle_dir(i, j, θ) = POSITIVE ⇒ bc1_cmp_left = $F_0$, bc1_cmp_right = $E_0$, dir_diff = $|E_{-θ} - F_θ|$ When angle_dir(i, j, θ) = NEGATIVE ⇒ bc1_cmp_left = $E_0$, bc1_cmp_right = $F_0$, dir_diff = $|F_{-θ} - E_θ|$ $bc1 = 64 \times \text{BC1\_GAIN}(\lfloor|\text{bc1\_cmp\_left} - \text{avg\_left}| - \text{dz\_left}\rfloor +$ $\lfloor|\text{bc1\_cmp\_right} - \text{avg\_right}| - \text{dz\_right}\rfloor) + 64 \times \text{dir\_diff}$ Where the notation $\lfloor x \rfloor$ may denote x lower bounded by zero and BC1_GAIN may be a programmable register value.

The larger the dead zone, the more lenient the bound check may be. A rather lax bound check may be useful when the edge in the image is rather indistinct due to, for example, it being relatively weak, or surrounded by texture or noise. Making the dead zone too large, however, may result in an angle direction being selected that may be incorrect. The bound check 1 automatic dead zone procedure may determine a value for bc1_dz by examining the pixels of interest and adjusting the size of the allowed dead zone to maximize its value only when it appears safe to do so. Once bc1_dz has been determined, it may be used as detailed hereinabove.

FIG. 14A illustrates a situation in which it may be safe to allow a relatively large dead zone. $E_0$ may have intensity somewhere between $E_{-θ}$ and $E_θ$, and $F_0$ may have intensity somewhere between $F_{-θ}$ and $F_θ$. This may be the case when $F_{-θ}$ and $E_θ$ lie along an edge. Allowing a larger dead zone in this situation may encourage this angle to be selected as the best edge direction option resulting in O being produced from $F_{-θ}$ and $E_θ$ as desired.

FIG. 14B illustrates a situation where a vertical object (black) may be bisecting a diagonal edge. The angle detector sensitive to the particular diagonal edge direction in question may give a strong indication that it has found a suitable edge. But it may be undesirable for O to be produced from $F_{-θ}$ and $E_θ$ since this will place an erroneous gray pixel within the vertical object. Although the bound check 1 will detect that $E_0$ and $F_0$ do not seem to fit the proposed edge direction too well, a large dead zone may significantly reduce the magnitude of the measure. Detecting the situation and reducing the size of the allowable dead zone may allow the bound check 1 to produce a large measure. This may reduce the likelihood that this angle may be selected as the basis for predicting O.

A maximum bound check 1 dead zone may be programmed into a register BC1_MAX_DZ. The bound check 1 auto dead zone procedure may then reduce this maximum value based on how far $E_0$ is outside of the intensity range of $E_{-\theta}$ and $E_\theta$, and how far $F_0$ is outside the intensity range of $F_{-\theta}$ and $F_\theta$. The bound check 1 test may be used as follows:

min_above=min($E_\theta$, $E_{-\theta}$)

max_above max($E_\theta$, $E_{-\theta}$)

min_below=min($F_\theta$, $F_{-\theta}$)

max_below=max($F_\theta$, $F_\theta$)

$bc\_vert=\lfloor min\_above-E_0 \rfloor + \lfloor E_0-max\_above \rfloor + \lfloor min\_below-F_0 \rfloor + \lfloor F_0-max\_below \rfloor$ $bc1\_dz=\lfloor BC1\_MAX\_DZ-BC1\_AUTODZ\_GAIN \times bc\_vert \rfloor$ Where BC_MAX_DZ and BC1_AUTODZ_GAIN may be programmable register values. A BC_AUTODZ_GAIN value of zero may effectively fix the bound check 1 dead zone value.

Referring to FIG. 8, the pixel O may be considered to be on the edge and may be typical of the discussion and diagrams detailed so far. However, there are many absent pixels to be determined that may not be on an edge but may be adjacent to one, such as the absent pixel above pixel D to the right of pixel O in FIG. 8, for example. It is important that an absent pixel adjacent to an edge is also created by filtering parallel to the direction of the edge. Should the angle detection process fail to ensure filtering in the correct direction, for some reason, influence of the (darker, in this case) edge pixels may cause this absent pixel to be tainted. As a result, the errors may reintroduce jaggies.

Referring again to FIG. 8, should the angle detection correctly select the 4× angle in the positive direction at the location of pixel O, it is likely that the same direction will match well for the adjacent pixel. However, in order for a direction to be used as the final angle selection, it may need to first go through the bound check tests. If the edge is broad, such as that in FIG. 8, the bound check 1, discussed above, may be suitable for both those pixels on and those adjacent to the edge. If the edge is very thin, however, the bound check 1 may be suitable for pixels exactly on the edge but may fail for pixels adjacent to the edge, particularly for absent pixels above or below a very low angle thin line. The pattern of pixels on and around a broad edge may conform to that anticipated by the bound check 1. Pixels that lie exactly on thin edges may also be accepted by bound check 1. Pixels adjacent to a thin edge, however, may cause bound check 1 to signify a mismatch. As such a procedure such as bound check 2 described below may be useful.

Figure 15:
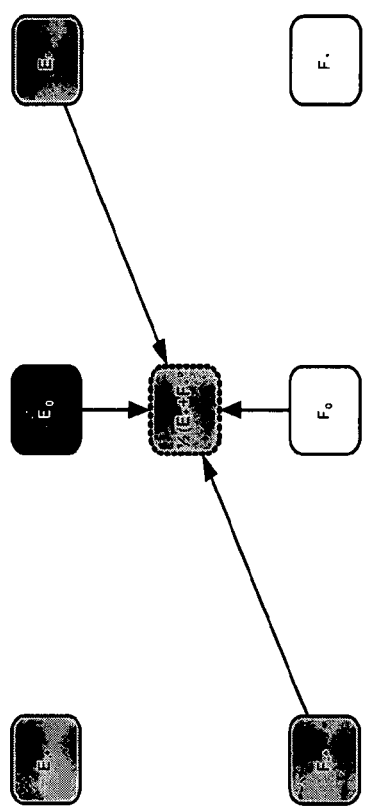
FIG. 15 illustrates an exemplary result of using bound check 2 to test surrounding pixels.

FIG. 15 illustrates an exemplary result of using bound check 2 to test surrounding pixels. Under the assumption that $F_{-0}$ and $E_0$ are on or adjacent to an edge, and given the direction of progression, it may be expected that the intensity of $F_{-\theta}$ and $E_\theta$ to lie between $E_0$ and $F_0$. The bound check 2 may measure how far $F_{-\theta}$ and $E_\theta$ may be from the midpoint between $E_0$ and $F_0$. Similarly to the bound check 1 case, a dead zone may be specified, within which deviations from the midpoint may not be penalized. The bound check 2 may be used as follows:

$$avg\_center = \frac{E_0 F_0}{2}$$

$$dz\_center = \min\left(bc2\_dz, \left|\frac{E_0 - F_0}{2}\right|\right)$$

When angle_dir(i, j, θ) = POSITIVE ⇒ bc2_cmp_left = $E_{-\theta}$, bc2_cmp_right = $F_\theta$ When angle_dir(i, j, θ) = NEGATIVE ⇒ bc2_cmp_left = $F_{-\theta}$, bc2_cmp_right = $E_\theta$ $$bc2 = 64 \times BC2\_GAIN \begin{pmatrix} \lfloor |bc2\_cmp\_left - avg\_center| - dz\_center \rfloor + \\ \lfloor |bc2\_cmp\_right - avg\_center| - dz\_center \rfloor \end{pmatrix}$$

Where BC2_GAIN may be a programmable register value.

Figure 16:
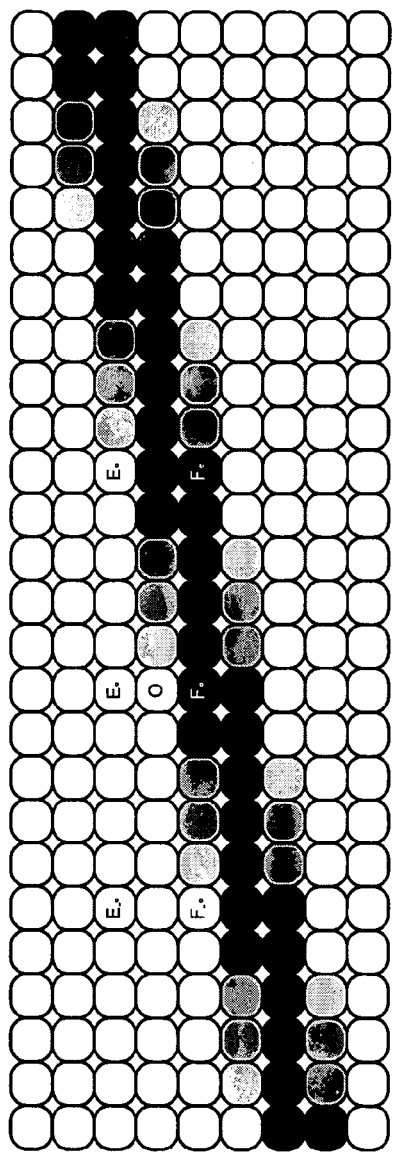
FIG. 16 illustrates an exemplary situation where a larger dead zone may be advantageous.

Just as in the bound check 1 case, under certain conditions it may be safer to allow a larger dead zone than others. A particular case for which a large dead zone is advantageous may be when the current absent pixel to be determined is adjacent to (above or below) a thin line that has a marked contrast difference compared to the surrounding background. FIG. 16 illustrates an exemplary situation where a larger dead zone may be advantageous.

FIG. 17A-D illustrate various situations of a black thin line on a white background. The figures labeled as upper triangle (FIG. 17A and 17C) show the situation that the current absent pixel is above the thin line. The figures labeled as lower triangle (FIG. 17B and 17D) have the absent pixel in question below the thin line.

Taking the negative direction upper triangle (FIG. 17C) case as an example, it illustrates that the absent pixel should be white, and although $F_{-\theta}$ and $E_\theta$ are good predictors of the absent pixel to be determined, the large contrast between $E_0$ and $F_0$ may result in avg center being significantly different from $F_{-\theta}$ and $E_\theta$. This may result in the bound check 2 measure giving a large response, dissuading the use of this direction for prediction. While the thin line of FIG. 16 has relatively few absent pixels that might have this issue, the problem may get more common as the angle of the edge gets closer to horizontal. The bound check 2 automatic dead zone may detect similar situations and allow a larger bc2_dz.

Figure 18:
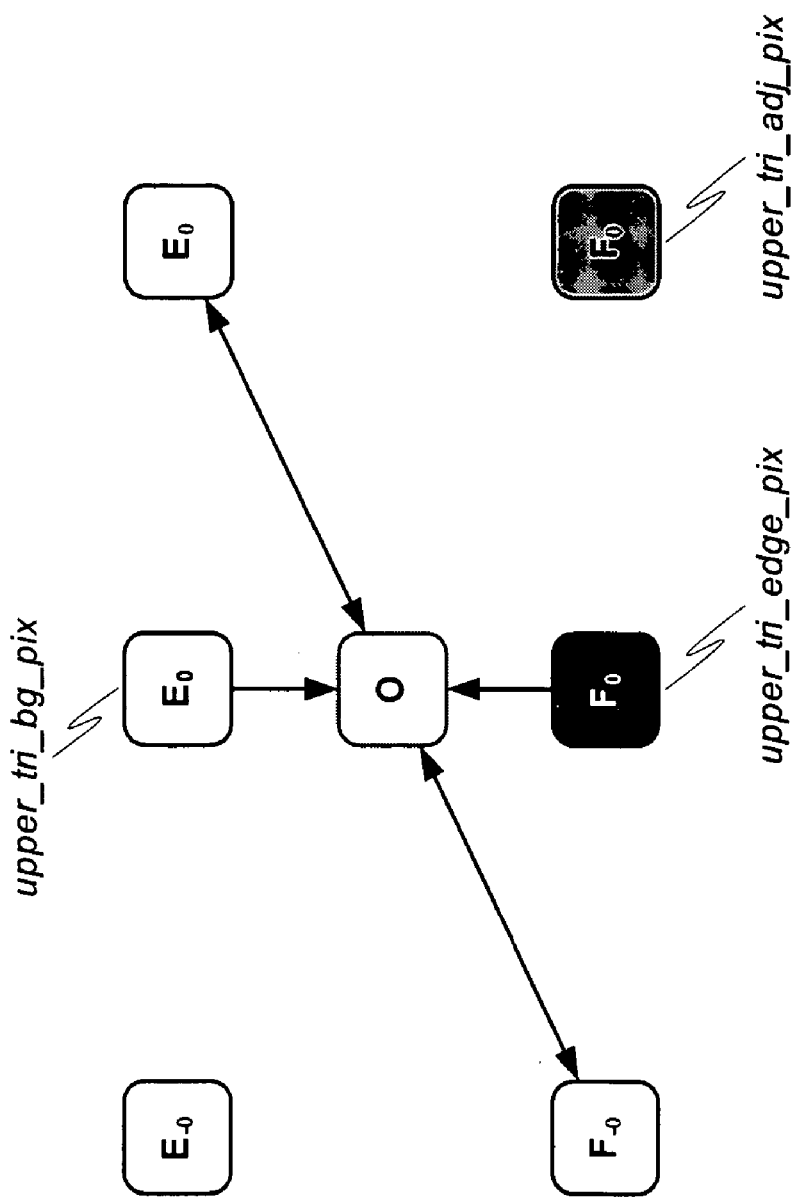
FIG. 18 illustrates a more detailed look at the negative direction upper triangle of FIG. 17C.

FIG. 18 illustrates a more detailed look at the negative direction upper triangle of FIG. 17C. If the _adj_pix is lighter than the _edge_pix, it may be assumed that the situation to be tested for is a dark edge on a light background. If the _bg_pix is the expected lighter than the_edge_pix, a measure may be taken to estimate the variance of the triangle of supposed background pixels. Both the upper and lower triangle versions may be computed and the minimum triangle variance may be taken. After multiplying by a scaling factor, this value may be subtracted from the programmed maximum value. The calculations for positive and negative angled edges may be as follows:

When angle_dir(i,j,θ) = POSITIVE ⇒upper_tri_range = range<$E_{-\theta},E_0,E_\theta,F_\theta$>, upper_tri_edge_pix = $F_0$,
upper_tri_adj_pix = $F_{-\theta}$,
lower_tri_range = range<$E_{-\theta},F_{-\theta},F_0,F_\theta$>,
lower_tri_edge_pix = $E_0$,
lower_tri_adj_pix = $E_\theta$ When angle_dir(i,j,θ) = NEGATIVE ⇒upper_tri_range = range<$F_{-\theta},E_{-\theta},E_0,E_\theta$>, upper_tri_edge_pix = $F_0$,
upper_tri_adj_pix = $F_\theta$, -continued

```
        lower_tri_range = range<F_-θ,F_0,F_θ,E_θ>,
        lower_tri_edge_pix = E_0,
        lower_tri_adj_pix = E_-θ
where range<A,B,C,D> = max<A,B,C,D>−min<A,B,C,D>
    if(upper_tri_adj_pix < upper_tri_edge_pix)
        if(upper_tri_bg_pix < upper_tri_edge_pix)
            upper_bg_measure = upper_tri_range
        else
            upper_bg_measure = 255
    else if(upper_tri_adj_pix > upper_tri_edge_pix)
        if(upper_tri_bg_pix > upper_tri_edge_pix)
            upper_bg_measure = upper_tri_range
        else
            upper_bg_measure = 255
    else
        upper_bg_measure = upper_tri_range
And
    if(lower_tri_adj_pix < lower_tri_edge_pix)
        if(lower_tri_bg_pix < lower_tri_edge_pix)
            lower_bg_measure = lower_tri_range
        else
            lower_bg_measure = 255
    else if(lower_tri_adj_pix > lower_tri_edge_pix)
        if(lower_tri_bg_pix > lower_tri_edge_pix)
            lower_bg_measure = lower_tri_range
        else
            lower_bg_measure = 255
    else
        lower_bg_measure = lower_tri_range
bg_measure = min<upper_bg_measure,lower_bg_measure>
bc2_dz = ⌊BC2_MAX_DZ−BC2_AUTODZ_GAIN×bg_measure⌋
```

Where BC2_MAX_DZ and BC2_AUTODZ_GAIN may be programmable register values. A BC2_AUTODZ_GAIN value of zero may effectively fix the bound check 2 dead zone value. Once calculated, bc2_dz may be used as the dead zone for bound check 2, as discussed hereinabove.

The next step is to modify the angle strength with the results of the bound checks. For the general case where $\theta \neq 0\times$, $\theta \neq 0.5\times$, each angle strength, determined as detailed hereinabove, may be adjusted by the results of the bound checks for that angle. If an edge exists at a given angle, it may be expected that one or other of the bound checks may "fit" and return a small value. The bound check 1 and bound check 2 values may be combined by taking the minimum of the two:

modified_angle_strength$(i,j,\theta)$=angle_strength$(i,j,\theta)$−
    min $bc1(i, j, \theta), bc2(i,j, \theta)$ For the cases where $\theta=0\times$ or $\theta=0.5\times$, the north and near-north detectors may remain unmodified by bound checks and:

modified_angle_strength$(i,j,\theta=0\times, \theta=0.5\times)$=angle_strength$(i,j,\theta)$ The following step may be used to make an angle decision. Referring to FIG. 9, all the modified_angle_strength($\theta$) and angle_dir($\theta$) may be examined for the current absent pixel (i,j) and a decision may be made as to which angle is to be used for determining the spatial approximation for this pixel. The following exemplary pseudo code may be utilized:

```
current_max_strength=max<modified_angle_strength(θ=0x),
    MIN_NORTH_STRENGTH>
current_best_angle = 0x
foreach θ=[0.5x,1x,2x,3x,4x,5x,6x,7x,8x,10x,12x,14x,16x,22x]
{
    if modified_angle_strength(θ) > current_max_strength
        current_max_strength = modified_angle_strength(θ)
        current_best_angle = θ
}
if alternating_angle_dir(θ=current_best_angle)
    select angle -> θ_best = 0x
else
    select angle -> θ_best = current_best_angle
```

When examining suitable angles, it may be expected that, as the "best" angle is approached, the modified_angle_strengths will increase (to a peak), but the angle_directions (POSITIVE or NEGATIVE) may remain uniform. The function alternating_angle_dir($\theta$) checks, for the current angle being examined, $\theta$, whether similar angle detectors determined different directions (POSITIVE or NEGATIVE). Alternating directions may be an indication of an indeterminate edge due to the edge being weak or due to high detail textures. If alternating edge directions are found, the search process may be abandoned and the vertical filter (0×) is selected. The following pseudo code may be used:

```
BOOLEAN alternating_angle_dir(θ)
{
    if θ == 0.5x OR θ == 1x
        return (angle_dir(θ=0.5x) ≠ angle_dir(θ=1x))
    if θ == 2x
        return     (angle_dir(θ=0.5x)    ≠    angle_dir(θ=1x)    ≠
angle_dir(θ=2x))
    if θ == 3x
        return (angle_dir(θ=1x) ≠ angle_dir(θ=2x) ≠
angle_dir(θ=3x))
    if θ == 4x
        return     (angle_dir(θ=2x)     ≠     angle_dir(θ=3x)     ≠
angle_dir(θ=4x))
    .              .              .             .
    .              .              .             .
    if θ == 22x
        return     (angle_dir(θ=14x)    ≠    angle_dir(θ=16x)    ≠
angle_dir(θ=22x))
}
```

Once a specific angle and direction have been selected, the luma spatial approximation for the absent pixel O may be determined. The spatial, temporal and inverse telecine luma approximations may be calculated in parallel and the final output pixel luma is a blend of all three controlled to ensure the best possible result given the situation of that pixel. sa($\theta=0\times$)=Int$_N \times P^T$, where this may represent a spatial filtering of pixels in the "North" (vertical) direction $$sa(\theta = 0.5x) = \frac{E_0 + E_{-1} + F_0 + F_1}{4} \quad \text{when angle\_dir}(\theta = 0.5x) \equiv \text{POSITIVE}$$

$$= \frac{E_0 + E_1 + F_0 + F_{-1}}{4} \quad \text{when angle\_dir}(\theta = 0.5x) \equiv \text{NEGATIVE}$$

$$sa(\theta \neq 0x, \theta \neq 0.5x) = \frac{E_{-\theta} + F_\theta}{2} \quad \text{when angle\_dir}(\theta) \equiv \text{POSITIVE}$$

$$= \frac{E_\theta + F_{-\theta}}{2} \quad \text{when angle\_dir}(\theta) \equiv \text{NEGATIVE}$$

The "North" spatial approximation may be computed along with the particular sa($\theta_{best}$), where $\theta_{best}$ is the result of the angle selection process as detailed hereinabove.

The final step in determining the luma spatial approximation for the current absent pixel O is to ascertain how different in intensity sa($\theta_{best}$) is from the north prediction sa($\theta=0\times$). If there is a marked difference, then for robustness, this may be allowed into the final spatial approximation if the strength of the chosen edge direction, modified_angle_strength($\theta_{best}$), is suitably large. The deviation from "North" may be range-limited based on the edge strength:

value_range=|modified_angle_strength($\theta_{best}$)−MIN_NORTH_STRENGTH|×RANGE_LIMIT_SCALE Where MIN_NORTH_STRENGTH and RANGE_LIMIT_SCALE are values from programmable registers and RANGE_LIMIT_SCALE is fractional in place of a divide. Using the generalized blend as described in U.S. patent application Ser. No. 11/026,369, filed Dec. 30, 2004:

$X=sa(\theta=0\times)$, $Y=sa(\theta_{best})$, $M$=value_range $Z=Y\_X$ $M_L=\max\{\min(M, Z)-M\}$ $sa=X+M_L$ Accordingly, U.S. patent application Ser. No. 11/026,369, filed Dec. 30, 2004 is incorporated herein by reference in its entirety.

Figure 19:
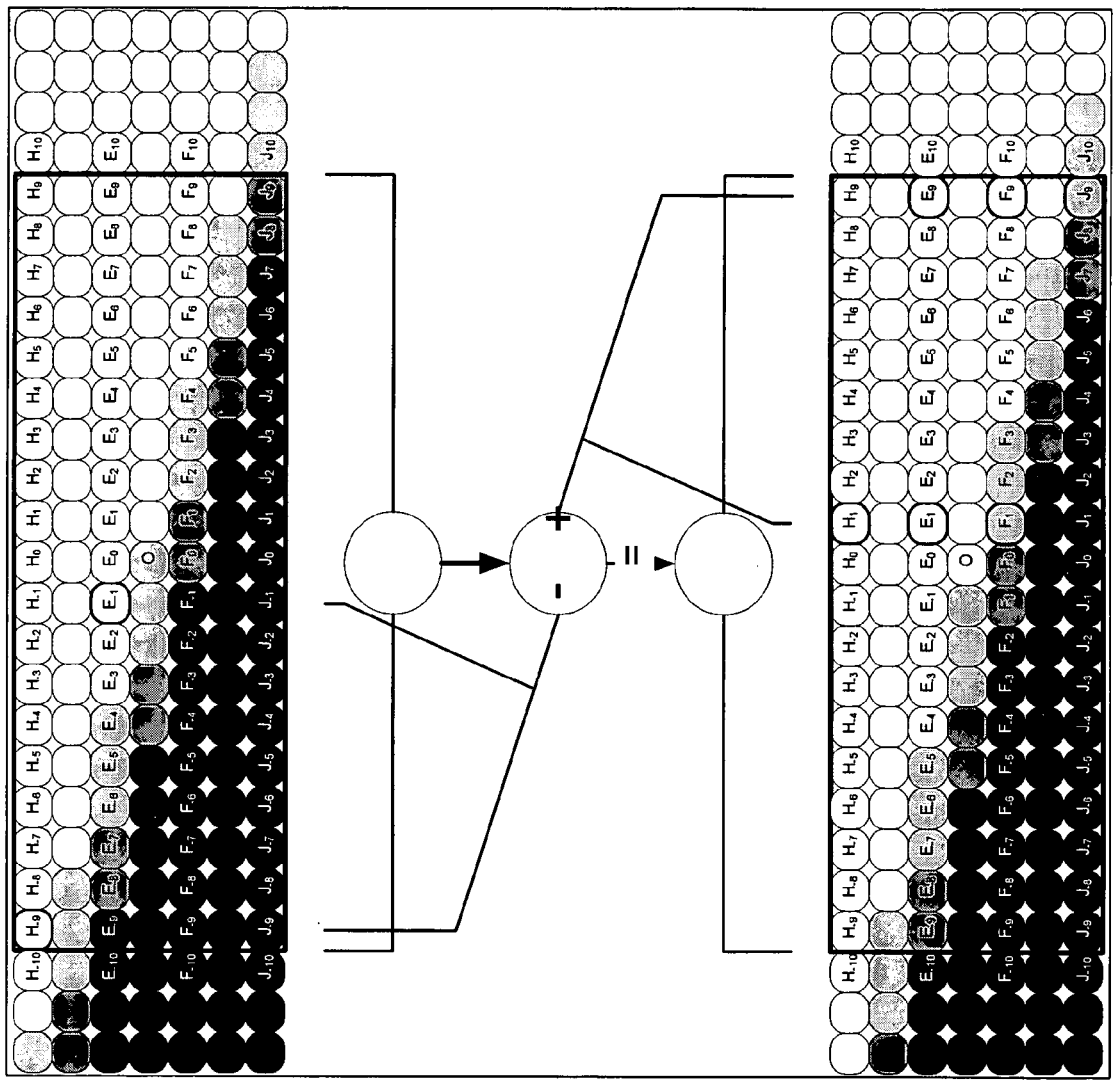
FIG. 19 illustrates an exemplary pixel window of the 4× angle detector, in accordance with an embodiment of the present invention.

FIG. 19 illustrates an exemplary pixel window of the 4× angle detector, in accordance with an embodiment of the present invention. As described hereinabove, angles differences summed over the range of pixels within the window may constitute positive and negative angle measures. Compared to the upper portion of FIG. 19, the lower portion shows the situation one pixel on; where the new current, present pixel "O" is one to the right. Equivalently to calculating all the angle differences for the new pixel window position, the previous total may be adjusted by subtracting those pixel differences that have "fallen off the edge" of the window, and adding those newly within its range. Therefore:

combined_diff_pos$_x(i, j, \theta)=|E_{x-\theta}-F_{x+\theta}|+|H_{x-\theta}-E_{x+\theta}|+|F_{x-\theta}-J_{x+\theta}|$ Where, for example:

$|E_\alpha - F_\beta| = |Y(t-3, i-1, j+\alpha) - Y(t-3, i+1, j+\beta)|$

When $(j+\alpha)$ is odd. (i.e. no collocated chroma on this pixel)

$|E_\alpha - F_\beta| = |Y(t-3, i-1, j+\alpha) - Y(t-3, i+1, j+\beta)| +$
$|U(t-3, i-1, j+\alpha) - U(t-3, i+1, j+\beta)| +$
$|V(t-3, i-1, j+\alpha) - V(t-3, i+1, j+\beta)|$ When $(j+\alpha)$ is even (i.e. collocated 4:2:2 chroma on this pixel) and $\frac{Y(t-3, i-1, j+\alpha) + Y(t-3, i+1, j+\beta)}{2} >$ MAD_LA_USE_CHROMA_LUMA_THRESH $|E_\alpha - F_\beta| = |Y(t-3, i-1, j+\alpha) - Y(t-3, i+1, j+\beta)|$ When $(j+\alpha)$ is even (i.e. collocated 4:2:2 chroma on this pixel) and $\frac{Y(t-3, i-1, j+\alpha) + Y(t-3, i+1, j+\beta)}{2} \leq$ MAD_LA_USE_CHROMA_LUMA_THRESH Where MAD_LA_USE_CHROMA_LUMA_THRESH is U8.0 with a reset value of 16. Additionally, setting MAD_LA_USE_CHROMA_LUMA_THRESH to 255 may effectively disable the use of chroma in the detector. And:

angle_diff_pos$(i,j,\theta)$=accum_diff_pos$(i,j,\theta)$=accum_diff_pos$(i,j,\theta)$+combined_diff_pos$_{range(\theta)}(i,j,\theta)$−combined_diff_pos$_{-range(\theta)-1}(i,j,\theta)$ angle_diff_neg$(i,j,\theta)$=accum_diff_neg$(i,j,\theta)$=accum_diff_neg$(i,j,\theta)$+combined_diff_neg$_{range(\theta)}(i,j,\theta)$−combined_diff_neg$_{-range(\theta)-1}(i,j,\theta)$ Storing the results of the combined_diff_pos(i,j,$\theta$) in a FIFO may simplify adjustment to the current accum_diff_pos (i,j,$\theta$). Furthermore, it may not be necessary to retain the full dynamic range and precision of the combined_diff_pos(i,j,$\theta$). Range limiting and quantizing these values before pushing on to the FIFO may save a significant number of gates.

Figure 20:
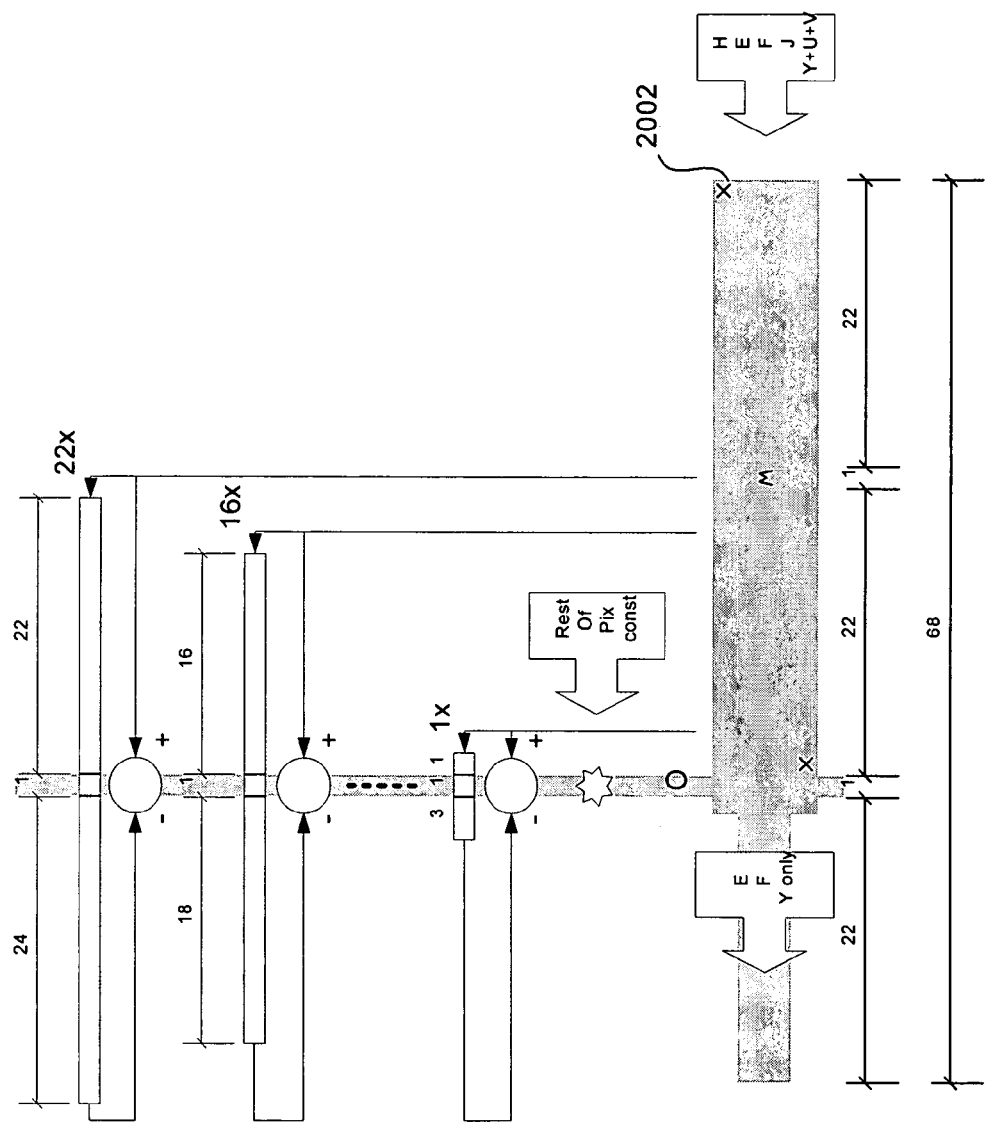
FIG. 20 illustrates an exemplary structure of the low angle pipeline, in accordance with an embodiment of the present invention.

FIG. 20 illustrates an exemplary structure of the low angle pipeline, in accordance with an embodiment of the present invention. Many angle detectors may run in parallel, and their angle FIFOs may be aligned so that the measurements for each may be valid at the horizontal location of the current output pixel. At this point a decision may be made as to which direction to filter. The pixels to the left of "O", along with those to the right, may then be used to provide the pixels needed to filter in the chosen direction. The luma and chroma for pixels H, E, F and J may enter the pipeline at 2002. The other pixels in the constellation may enter at the point where they may be needed, for example, at the same location as the current output pixel. As a result a great deal of pipelining may be eliminated. Additionally, beyond pixel O, luma for E and F only may be continued in the pipeline. FIG. 20 may be illustrative of the relationship between the pixel pipeline and quantized FIFO pipelines.

In an embodiment of the present invention, several pipeline stages may be utilized to take the results from the quantized angle FIFO accumulators and determine a final angle decision.

An embodiment of the present invention may be used, for example, in 2:1 vertical upscaling process that may also be part of deinterlacing. A similar scheme of an angle detector may be followed by a decision process and directional filtering, which may be used for general purpose upscaling. For example, taking a 480p output of a deinterlacer and scaling it up to 720p for display on a large screen TV.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general_purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing video data comprising:
  one or more circuits operable for, at least:
    generating a plurality of windows of pixels using one of an even field and an odd field of an interlaced video image, wherein the windows have different sizes and each of the plurality of windows comprises an absent pixel located at the center of each of the plurality of windows;
    detecting an angle associated with an angled edge in each of the plurality of windows; and
    determining a direction associated with the angled edge based on the detected angles of the plurality of windows.

2. The system according to claim 1, wherein the detecting of the angle associated with the angled edge comprises:
    determining a first angle measure and a second angle measure associated with the angled edge;
    determining a strength measure and a direction measure associated with the angled edge using the first angle measure and the second angle measure;
    examining a pattern associated with pixels surrounding the absent pixel; and
    adjusting the first angle measure and the second angle measure based on the pattern.

3. The system according to claim 2, wherein the first angle measure is a measure of an angle in a first direction associated with the angled edge, and the second angle measure is a measure of an angle in a second direction associated with the angled edge, wherein the second direction is an opposite of the first direction.

4. The system according to claim 1, wherein the angle of the angled edge may be determined in terms of a displacement associated with pixels in a window of pixels.

5. The system according to claim 1, wherein the one or more circuits is further operable for, at least determining a value for the absent pixel using the determined direction.

6. The system according to claim 5 wherein said value comprises a luma.

7. The system according to claim 1, wherein the one or more circuits is further operable for, at least filtering pixels associated with the angled edge along the determined direction to determine a value for the absent pixel.

* * * * *